US012587842B2

(12) United States Patent
Shi et al.

(10) Patent No.: US 12,587,842 B2
(45) Date of Patent: Mar. 24, 2026

(54) KEY UPDATE METHOD, NETWORK DEVICE, SYSTEM, AND STORAGE MEDIUM

(71) Applicant: HUAWEI TECHNOLOGIES CO., LTD., Shenzhen (CN)

(72) Inventors: Rui Shi, Shenzhen (CN); Xibo Yu, Huizhou (CN); Wei Zhou, Shenzhen (CN); Tianyan Wang, Huizhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 607 days.

(21) Appl. No.: 17/925,580

(22) PCT Filed: Apr. 23, 2021

(86) PCT No.: PCT/CN2021/089408
§ 371 (c)(1),
(2) Date: Nov. 15, 2022

(87) PCT Pub. No.: WO2021/227835
PCT Pub. Date: Nov. 18, 2021

(65) Prior Publication Data
US 2023/0199487 A1 Jun. 22, 2023

(30) Foreign Application Priority Data

May 15, 2020 (CN) .......................... 202010414324.5
Dec. 10, 2020 (CN) .......................... 202011435123.X

(51) Int. Cl.
*H04W 12/0433* (2021.01)
*H04L 9/40* (2022.01)
(Continued)

(52) U.S. Cl.
CPC ......... *H04W 12/0433* (2021.01); *H04L 63/20* (2013.01); *H04W 12/0431* (2021.01)

(58) Field of Classification Search
CPC .......... H04W 12/0433; H04W 12/0431; H04L 63/20; H04L 63/06; H04L 63/061; H04L 63/062; H04L 63/064; H04L 63/065
See application file for complete search history.

(56) References Cited

U.S. PATENT DOCUMENTS

| | | | |
|---|---|---|---|
| 7,958,356 B1 | 6/2011 | Subramanian et al. | |
| 2014/0146966 A1 | 5/2014 | Bieber | |

(Continued)

FOREIGN PATENT DOCUMENTS

| | | |
|---|---|---|
| CN | 108650676 A | 10/2018 |

OTHER PUBLICATIONS

Adomnicai et al., "Hardware Security Threats Against Bluetooth Mesh Networks," IEEE CNS 2018—IEEE International Workshop on Attacks and Defenses for Internet-of-Things (ADIoT), Total 9 pages, Institute of Electrical and Electronics Engineers, New York, New York (Date of Conference: May 30-Jun. 1, 2018; Date Added to IEEE. Xplore: Aug. 13, 2018).

(Continued)

*Primary Examiner* — Edward Zee
(74) *Attorney, Agent, or Firm* — Leydig, Voit & Mayer, Ltd.

(57) ABSTRACT

A key update method, a network device, a system, and a storage medium, applied to a Bluetooth mesh network. The Bluetooth mesh network includes at least two mesh nodes. A configuration node is a mesh node in the Bluetooth mesh network, and the configuration node is configured to configure a network key of the Bluetooth mesh network. The configuration node determines a first mesh node from mesh nodes in the Bluetooth mesh network, where a network key locally maintained by the first mesh node is inconsistent with a current network key of the Bluetooth mesh network. Therefore, the configuration node encrypts the first network (Continued)

key by using a device key of the first mesh node, to obtain a first ciphertext, and sends a first message that carries the first ciphertext, so that the first mesh node obtains the first network key.

14 Claims, 9 Drawing Sheets

(51) Int. Cl.
H04L 29/06 (2006.01)
H04W 12/0431 (2021.01)

(56) References Cited

U.S. PATENT DOCUMENTS

| | | | |
|---|---|---|---|
| 2018/0063094 A1* | 3/2018 | Albrecht | H04L 9/0833 |
| 2020/0146088 A1* | 5/2020 | Kharvar | H04L 63/0428 |
| 2021/0044971 A1* | 2/2021 | Pandey | H04W 4/80 |

OTHER PUBLICATIONS

Adomnicai et al., "Hardware Security Threats Against Bluetooth Mesh Networks," 2018 IEEE Conference On Communications and Network Security (CNS), XP033383983, IEEE International Workshop on Attacks and Defenses for Internet-of-Things (ADIoT), Total 9 pages, Institute of Electrical and Electronics Engineers, New York, New York (May 30, 2018).

* cited by examiner

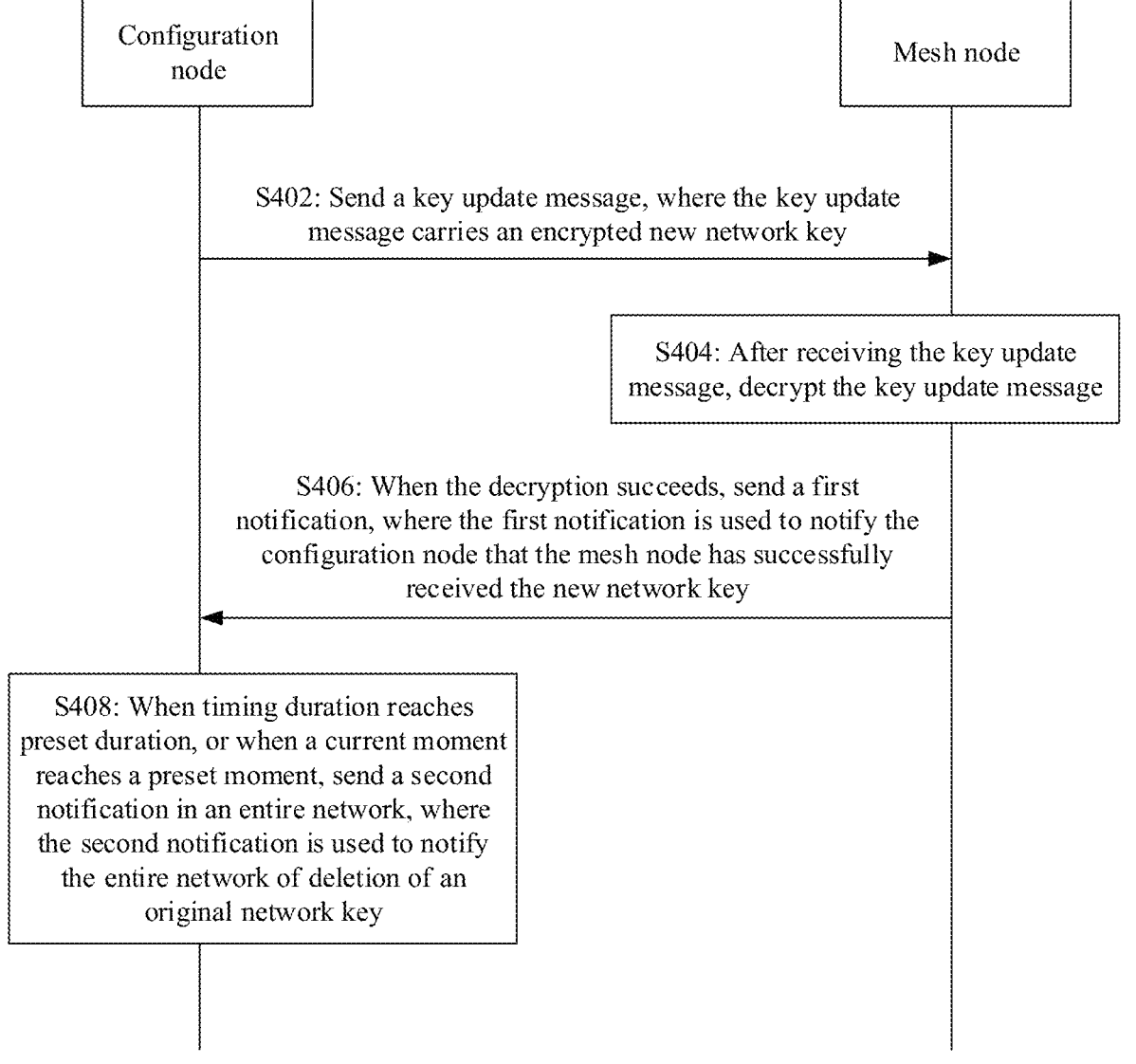

S402: Send a key update message, where the key update message carries an encrypted new network key S404: After receiving the key update message, decrypt the key update message S406: When the decryption succeeds, send a first notification, where the first notification is used to notify the configuration node that the mesh node has successfully received the new network key S408: When timing duration reaches preset duration, or when a current moment reaches a preset moment, send a second notification in an entire network, where the second notification is used to notify the entire network of deletion of an original network key

FIG. 4

KEY UPDATE METHOD, NETWORK DEVICE, SYSTEM, AND STORAGE MEDIUM

This application is a national stage of International Application No. PCT/CN2021/089408, filed on Apr. 23, 2021, which claims priority to Chinese Patent Application No. 202010414324.5, filed on May 15, 2020 and Chinese Patent Application No. 202011435123.X, filed on Dec. 10, 2020. All of the aforementioned applications are incorporated herein by reference in their entireties.

TECHNICAL FIELD

Embodiments of this application relate to the field of communications technologies, and in particular, to a key update method, a network device, a system, and a storage medium.

BACKGROUND

As a wireless multi-hop interconnection technology for low-power and low-power-consumption devices, Bluetooth, together with a Wi-Fi technology, a ZigBee technology, and the like, is used as an internet of things (IoT) networking mode and enters a smart home application environment. A Bluetooth mesh networking mode is also gradually applied to the IoT field.

In a wireless network constructed by using a Bluetooth mesh networking technology (briefly referred to as a Bluetooth mesh network below), each mesh node stores a network key (NetKey). When mesh nodes communicate with each other, information is encrypted by using NetKey, and then information exchange is performed. To prevent a trash-can (trash-can) attack, each time one mesh node is deleted from the Bluetooth mesh network, NetKey needs to be updated in the entire Bluetooth mesh network.

However, if a mesh node misses a key refresh procedure due to a reason, the mesh node cannot obtain latest NetKey. As a result, the mesh node cannot communicate with another mesh node in the Bluetooth mesh network.

SUMMARY

This application provides a key update method, a network device, a system, and a storage medium, to provide a latest key for a network node that misses a key refresh procedure.

According to a first aspect, this application provides a key update method, applied to a Bluetooth mesh network. The Bluetooth mesh network includes at least two network nodes. A configuration node is a network node in the Bluetooth mesh network. The configuration node is configured to configure a network key of the Bluetooth mesh network. The method includes: The configuration node determines a first network node from network nodes in the Bluetooth mesh network, where a network key locally maintained by the first network node is inconsistent with a first network key of a current Bluetooth mesh network. Therefore, the configuration node encrypts the first network key by using a device key of the first network node, to obtain a first ciphertext, and further, the configuration node sends a first message (that is, a message 1 in the following specific implementation), so that the first network node obtains the first network key, where the first message carries the first ciphertext.

In other words, when the first network node misses a key refresh procedure, the network key locally maintained by the first network node is inconsistent with the first network key.

In this case, the configuration node sends the first message to the first network node, so that the first network node obtains the first network key, where the first message carries the first ciphertext obtained by encrypting the first network key by the configuration node by using the device key of the first network node. Therefore, only the configuration node and the first network node in the entire Bluetooth mesh network can decrypt the first message, to ensure communication security.

According to the solution provided in this embodiment, a network key recovery method is provided for the first network node that misses the key refresh procedure, and a user does not need to manually add the first network node to the mesh network again, to improve network key recovery efficiency.

In this embodiment of this application, the Bluetooth mesh network may include a long power supply node and a low power node (Low Power Node, LPN). Usually, the long power supply node does not have a sleep state, and the LPN has a sleep state and an awake state, to reduce power consumption of the LPN. Alternatively, the long power supply node may be understood as a network node other than the LPN in the Bluetooth mesh network.

On the one hand, after switching from a sleep state to an awake state, the LPN may send a second message to the configuration node based on a situation of the LPN (details are described below in a method shown in a second aspect, and are not described herein), to actively request an update and synchronization of the network key.

In a possible embodiment, that the configuration node determines a first network node from network nodes in the Bluetooth mesh network includes: The configuration node receives a second message (that is, a message 2 in the following specific implementation), where the second message is used to request to synchronize the network key. When a network node indicated by a requester identifier carried in the second message is not a deleted node, the configuration node determines the network node indicated by the requester identifier carried in the second message as the first network node. In other words, any network node in the Bluetooth mesh network may actively request to synchronize the network key from the configuration node. Correspondingly, the configuration node uses the network node as the first network node, and sends the first message to the first network node, so that the first network node obtains a first network key of a current Bluetooth mesh network, to implement synchronization of the network key.

On the other hand, the long power supply node does not have a sleep state. In this case, for a long power supply node that fails to update a key and that is recorded by the configuration node, the configuration node may actively perform key recovery on the long power supply node after a key refresh procedure ends.

In a possible implementation, that the configuration node determines a first network node from network nodes in the Bluetooth mesh network includes: The configuration node determines each long power supply node in an update failure list as the first network node, where the update failure list is used to record all network nodes that fail to update a key and that are not deleted nodes in the Bluetooth mesh network, and the long power supply node is a network node other than a low power node in the Bluetooth mesh network. In other words, the configuration node may actively perform key recovery processing on all long power supply nodes in the update failure list, that is, the configuration node sends the first message to each of all the long power supply nodes (used as first network nodes in this case) in the update failure list.

In addition, the configuration node may send the first message to each of a plurality of first network nodes, and first messages sent by the configuration node to different first network nodes are different. This is because any first network node has a unique device key, that is, device keys of the plurality of first network nodes are different. In this case, first ciphertexts obtained by encrypting the first network key by using different device keys are also different. In other words, first ciphertexts carried in first messages of different first network nodes are different, and first messages sent by the configuration node to the different first network nodes are different.

In a possible design, the key method provided in this embodiment of this application may be applied to the key refresh procedure and then performed in cooperation with the key refresh procedure. For example, when a new network node joins a Bluetooth mesh network or a network node exits the Bluetooth mesh network, the key refresh procedure may be started. A network node that misses the key refresh procedure may be used as the first network node, and the configuration node performs the foregoing key update method, so that the first network node obtains the first network key. In this way, a key recovery method is provided for the network node that misses the key update, and a user does not need to manually add the first network node to the mesh network again, to improve network key recovery efficiency.

Further, the configuration node may maintain the update failure list after the key refresh procedure ends. Specifically, the method further includes: determining that a corresponding network node that does not receive a first notification is an update failure node, and obtaining the update failure list, where the first notification is used to notify the configuration node that the network node has successfully received the first network key.

In this embodiment of this application, the configuration node is a mesh gateway in the Bluetooth mesh network, or the configuration node is another long power supply node.

In this embodiment of this application, the first message is a broadcast frame, and the first message carries an identifier of the first network node. Specifically, the first message may be a configuration broadcast frame, that is, a configuration Beacon. For example, the identifier of the first network node may be a media access control (Media Access Control, MAC) address of the first network node.

In an embodiment of this application, the second message, that is, the message 2 in the following specific implementation, may also be a configuration broadcast frame (configuration Beacon), and carries an identifier of the configuration node. For example, the identifier of the configuration node may be a MAC address of the configuration node.

According to a second aspect, this application provides a key update method, applied to a Bluetooth mesh network. The Bluetooth mesh network includes at least two network nodes. A configuration node is a network node in the Bluetooth mesh network. The configuration node is configured to configure a network key of the Bluetooth mesh network, and a first network node is any network node other than the configuration node. The method includes: The first network node sends a second message to the configuration node, where the second message is used to request to synchronize a network key. After receiving the second message, the configuration node sends a first message to the first network node. The first network node receives the first message from the configuration node, where the first message carries a first ciphertext, and the first ciphertext is obtained by encrypting a first network key of the Bluetooth mesh network by using a device key of the first network node. A network key locally maintained by the first network node is inconsistent with the first network key, the first network node decrypts the first ciphertext by using the device key of the first network key, to obtain the first network key, and the first network node updates the locally maintained network key to the first network key.

According to the solution provided in this embodiment, the first network node may actively request to synchronize the network key from the configuration node, and decrypt, by using the device key of the first network node, the first ciphertext carried in the first message from the configuration node, to obtain a first network key of a current Bluetooth mesh network, so as to implement key synchronization. In this process, the device key of the first network node is known only to the configuration node and the first network node, which facilitates security of the first message in a message transmission process. In addition, in this method, a network key recovery method is provided for the first network node that misses a key refresh procedure, and a user does not need to manually add the first network node to the mesh network again, to improve network key recovery efficiency.

In a possible embodiment, after completing the foregoing key refresh procedure, the first network node may further send a third message to the configuration node, where the third message is used to indicate that the first network node has successfully synchronized the first network key.

In a possible embodiment, after the first network node completes the foregoing key refresh procedure, the first network node may further update a network-wide encryption index (IV Index), update an application key (AppKey), or reset a local sequence number (SegNum) by using the first network key.

In a possible embodiment, the first network node may send the second message to the configuration node when the first network node fails to establish a friend relationship for a plurality of times after being woken up.

Specifically, when the first network node switches from a sleep state to an awake state, the first network node sends a fourth message to a second network node, where the second network node has established a friend relationship with the first network node (in this embodiment, the second network node is a friend node of the first network node). The second network node is configured to temporarily store a message for the first network node when the first network node is in the sleep state, and the fourth message is used to request to obtain the message temporarily stored by the second network node for the first network node. For example, the fourth message may be a friend poll message.

If a feedback message from the second network node is never received within preset first duration, the first network node may send the fourth message to the second network node at intervals (for example, periodically) until a feedback from the second network node is received, or a quantity of times of sending the fourth message reaches a preset first threshold.

In this case, when the quantity of times of sending the fourth message reaches the preset first threshold and a feedback message from the second network node is never received, the first network node broadcasts a fifth message, where the fifth message is used to request to establish a friend relationship. For example, the fifth message may be a friend request message.

When a quantity of times of sending the fifth message reaches a preset second threshold and a feedback message from another network node is never received, the first network node sends the second message (that is, a message 2) to the configuration node.

According to a third aspect, this application provides a network device. The network device includes at least one processor and a memory. The memory stores computer-executable instructions. The at least one processor executes the computer-executable instructions, so that the network device performs the method according to any embodiment of the first aspect or the second aspect.

According to a fourth aspect, this application provides a network system. The network system includes at least two network nodes. A configuration node is a network node in a Bluetooth mesh network, and the configuration node is configured to configure a network key of the Bluetooth mesh network, and is configured to perform the method according to any embodiment of the first aspect. Any network node other than the configuration node is configured to perform the method according to any embodiment of the second aspect.

According to a fourth aspect, this application provides a computer-readable storage medium. The computer-readable storage medium stores computer-executable instructions, and when a processor executes the computer-executable instructions, the method according to the first aspect or the second aspect is implemented.

According to a fifth aspect, this application provides a computer program. The computer program is executed by a computer to perform the method according to the first aspect or the second aspect.

In a possible design, all or a part of the program in the fifth aspect may be stored in a storage medium encapsulated with a processor, or a part or all of the program may be stored in a memory that is not encapsulated with the processor.

In conclusion, according to the key update method, the network device, the system, and the storage medium that are provided in embodiments of this application, in each node in the Bluetooth mesh network, the first network key of the current Bluetooth mesh network is encrypted by using the device key of the first network node, and the network key locally maintained by the first network node is inconsistent with the first network key of the current Bluetooth mesh network. Therefore, the configuration node sends the first ciphertext obtained by encrypting the first network key to the first network node, so that the first network node can synchronize the first network key. A method for synchronizing a latest network key can be provided for the first network node that misses the key refresh procedure. In addition, only the configuration node and the first network node in the entire Bluetooth mesh network can decrypt the first message, to ensure communication security in the key refresh procedure.

BRIEF DESCRIPTION OF DRAWINGS

FIG. 4 is a schematic diagram of message exchange in a key update method according to this application;

DESCRIPTION OF EMBODIMENTS

The following describes implementations of embodiments in detail with reference to accompanying drawings.

In this application, "at least one" means one or more, and "a plurality of" means two or more. A term "and/or" describes an association relationship between associated objects and indicates that three relationships may exist. For example, A and/or B may indicate the following three cases: Only A exists, both A and B exist, and only B exists, where A and B may be singular or plural. A character "I" generally indicates an "or" relationship between associated objects. At least one of the following items (pieces) or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

Embodiments of this application may be applied to any Bluetooth mesh network.

The Bluetooth mesh network is a many-to-many (Many-to-Many) network. The Bluetooth mesh network may include a plurality of network nodes. The network node is a node in the Bluetooth mesh network. The network node may also be briefly referred to as a node, a mesh node, a device node, a mesh device, or the like. A name of the network node is not particularly limited in embodiments of this application. In the Bluetooth mesh network, each network node may freely communicate with another network node, and a relay (Relay) node may relay forward a received message (message). In this way, in the Bluetooth mesh network, a message may arrive at a receive end through relay forwarding of one or more mesh nodes. This also greatly expands a message transmission range and coverage of the mesh network.

Figure 1:
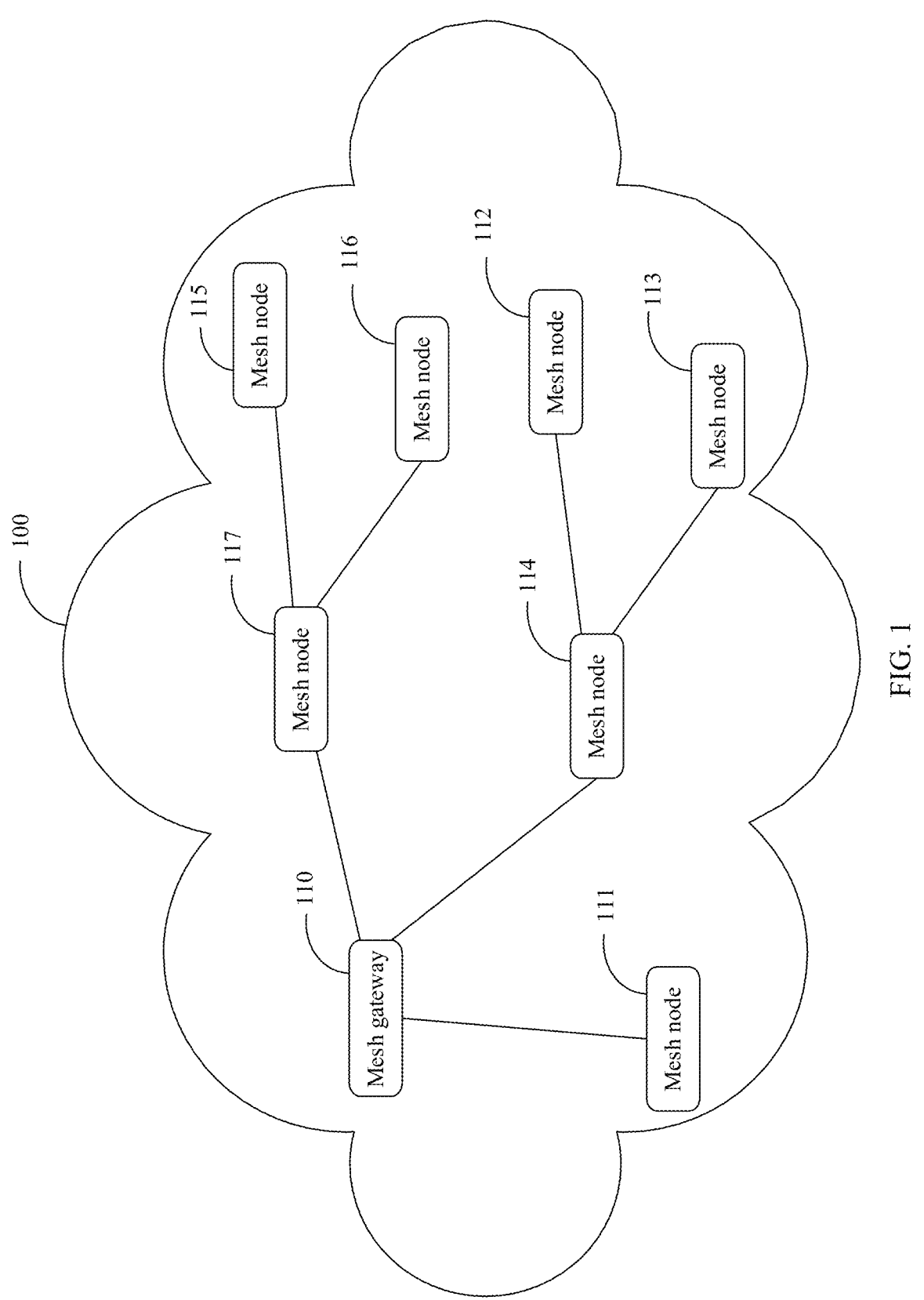
FIG. 1 is a schematic diagram of an architecture of a Bluetooth mesh network according to this application.

For example, FIG. 1 is a schematic diagram of a Bluetooth mesh network according to an embodiment of this application. A Bluetooth mesh network 100 shown in FIG. 1 includes a plurality of network nodes, including a gateway node (or may be referred to as a mesh gateway, a mesh gateway node, or the like). The mesh gateway is configured to implement communication between the Bluetooth mesh network and another network. For example, the mesh gateway may implement communication between the Bluetooth mesh network and a network such as a wireless fidelity (Wireless Fidelity, Wi-Fi) network or a ZigBee (ZigBee) network. Details are specifically described below with reference to FIG. 1.

The Bluetooth mesh network 100 may include one mesh gateway. In addition, the Bluetooth mesh network may further include other mesh nodes. As shown in FIG. 1, the Bluetooth mesh network 100 includes a mesh gateway 110 and a plurality of mesh nodes: a mesh node 111 to a mesh node 117.

In the Bluetooth mesh network, the other mesh nodes may be directly connected to the mesh gateway 110, or may be indirectly connected to the mesh gateway 110 through one or more other mesh nodes. As shown in FIG. 1, the mesh node 111 is directly connected to the mesh gateway 110, the mesh node 112 and the mesh node 113 are connected to the mesh gateway 110 through the mesh node 114, and the mesh node 115 and the mesh node 116 are connected to the mesh gateway 110 through the mesh node 117.

It should be understood that a quantity of mesh nodes and a connection relationship among the mesh nodes included in the Bluetooth mesh network shown in FIG. 1 are merely examples, and this embodiment of this application is not limited thereto. For example, the Bluetooth mesh network may further include more or fewer mesh nodes. For another example, after one or more of the mesh node 111 to the mesh node 117, more mesh nodes may be connected.

Mesh nodes may be classified based on whether the mesh node has a sleep state. Specifically, the mesh nodes in the Bluetooth mesh network 100 may be classified into a long power supply node and a low power node (Low Power Node, LPN). Usually, the long power supply node does not have a sleep state, and the LPN has a sleep state and an awake state, to reduce power consumption of the LPN.

In an example embodiment, a mesh node directly connected to a power supply may be the long power supply node, and a mesh node powered by a battery or another mobile power supply (or device) may be the LPN. For example, the long power supply node may be an electronic device such as a television or a computer connected to a power supply, and the long power supply node may communicate with another mesh node by using a Bluetooth module. The LPN may be an electronic device such as a mobile phone, a Bluetooth headset, or a Bluetooth speaker that has a Bluetooth function. Usually, the LPN is not continuously connected to a power supply for a long time, may be powered by a battery or the like, and communicate with another mesh node.

In the Bluetooth mesh network, the mesh gateway is the long power supply node. Mesh nodes other than the mesh gateway include a long power supply node and an LPN. The LPN may be directly connected to the mesh gateway, or indirectly connected to the mesh gateway through one or more other mesh nodes (long power supply nodes).

For example, in the Bluetooth mesh network 100 shown in FIG. 1, the mesh gateway 110 is a long power supply node. In addition, the mesh node 114 and the mesh node 117 may be long power supply nodes, and other nodes such as the mesh node 111 to the mesh node 113 and the mesh node 115 and the mesh node 116 may be LPNs. The LPN (for example, the mesh node 111) may be directly connected to the mesh gateway 110, or the LPNs (for example, the mesh node 112 and the mesh node 113, or the mesh node 115 and the mesh node 116) may be connected to the mesh gateway 110 through the long power supply node. In this case, the long power supply node is used as a relay node or a friend node (Friend node).

When mesh nodes are classified based on function roles, the Bluetooth mesh network may include the following: a mesh gateway node (or referred to as a Bluetooth mesh gateway), a Bluetooth relay node (Mesh Relay node), a proxy node, a friend node, and a Bluetooth LPN.

The mesh gateway is configured to connect the Bluetooth mesh network to another network. For example, in a subsequent scenario shown in FIG. 1, the mesh gateway may be used to connect the Bluetooth mesh network to a Wi-Fi router, to further connect to the another network. Details are described below.

In addition, the mesh gateway may be further used as a network access provisioner (Provisioner) and/or a configuration client. The network access provisioner is responsible for access of mesh nodes in the entire Bluetooth mesh network, and the configuration client is responsible for network-wide configuration, which may specifically include but is not limited to configuration of NetKey.

It should be noted that, in an actual scenario, the mesh gateway is usually used as a network access provisioner and a configuration client. However, in the actual scenario, whether the configuration client and the network access provisioner are the mesh gateway is not particularly limited in this embodiment of this application.

Specifically, the configuration client and the network access provisioner may be implemented by using one or more long power supply nodes. For ease of description, a mesh node that undertakes a network-wide configuration function of the configuration client is referred to as a configuration node below. For example, in the Bluetooth mesh network 100 shown in FIG. 1, the mesh gateway 110 (a long power supply node) may be used as a configuration client and a network access provisioner, and undertake a network-wide (Bluetooth mesh network) NetKey configuration function and a network-wide network access management function. Alternatively, the mesh node 114 (a long power supply node) is used as a configuration client, and undertakes a network-wide NetKey configuration function, and the mesh node 117 (another long power supply node) may be used as a network access provisioner, and undertake a network-wide network access management function.

The Bluetooth relay node (Mesh Relay node) is usually a long power supply node, and is responsible for forwarding a network message. For example, in the Bluetooth mesh network 100 shown in FIG. 1, the mesh node 114 may be used as the Bluetooth relay node, and may be configured to forward a network message between the mesh gateway 110 and the mesh node 112, and may be further configured to forward a network message between the mesh gateway 110 and the mesh node 112.

The proxy node is usually a long power supply node, and is responsible for serving as a proxy for a BLE device in a non-Bluetooth mesh network to access the Bluetooth mesh network. For example, in the Bluetooth mesh network 100 shown in FIG. 1, the mesh node 114 and the mesh node 117 may be used as proxy nodes to perform proxy processing for network access for a BLE device that is not in the current Bluetooth mesh network system. A proxy process is not described in detail herein.

The friend node is a long power supply node, and may be configured to temporarily store a message for a sleeping node (that is, an LPN in a sleep state) with which the friend node has established a friend relationship (Friend relationship). In this way, when the sleeping LPN wakes up, the sleeping LPN may obtain the message in a sleep period of the sleeping LPN node through interaction with the friend node. In the Bluetooth mesh network 100 shown in FIG. 1, the mesh node 117 may be used as a friend node of the mesh node 115 and the mesh node 116, and the mesh node 117 may temporarily store a message for the mesh node 115 or the mesh node 116 in a sleep period of the mesh node 115 or the mesh node 116. The mesh node 114 may be used as a friend node of the mesh node 112 and the mesh node 113, and the mesh node 114 may temporarily store a message for the mesh node 112 or the mesh node 113 in a sleep period of the mesh node 112 or the mesh node 113.

In an example embodiment, when the mesh node 112 wakes up after sleeping, the mesh node 112 may send a friend poll message to a friend node of the mesh node 112, that is, the mesh node 114, where the friend poll message is used to request, from the friend node, a network message in a sleep period of the mesh node 112. Therefore, when the mesh node 114 receives the friend poll message and stores a temporarily stored message in the sleep period of the mesh node 112, the mesh node 114 may feed back a response message of the friend poll message to the mesh node 112. The response message carries the message temporarily stored by the mesh node 114 for the mesh node 112 in the sleep period of the mesh node 112.

In a possible embodiment, to maximize a coverage area of a mesh network, a long power supply node is simultaneously used as a relay node, a proxy node, and a friend node. In this case, the long power supply node may be referred to as a mesh relay or a proxy and friend node. For example, in the system shown in FIG. 1, the mesh node 114 may be a mesh relay or a proxy and friend node.

As described above, embodiments of this application may be applied to any Bluetooth mesh network, and the Bluetooth mesh network may communicate with another network.

Figure 2:
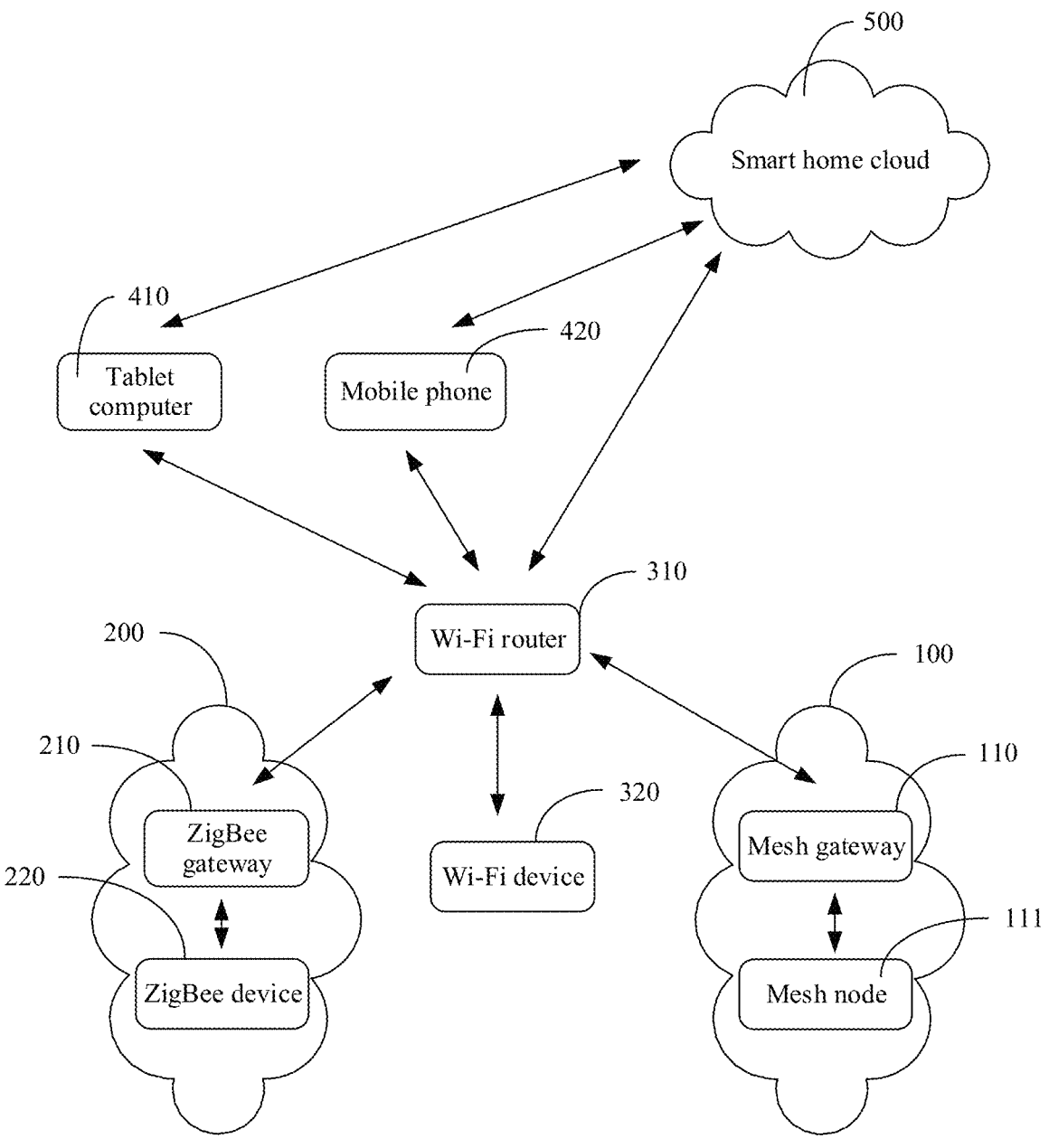
FIG. 2 is a schematic diagram in which a Bluetooth mesh network is applied to a smart home application scenario according to an embodiment of this application.

For example, a Bluetooth mesh network may be further applied to a smart home application scenario. In this case, FIG. 2 is a schematic diagram in which a Bluetooth mesh network is applied to a smart home application scenario according to an embodiment of this application. As shown in FIG. 2, a communications system includes a Bluetooth mesh network 100. For example, the Bluetooth mesh network shown in FIG. 2 includes a mesh gateway 110 and a mesh node 111. It may be understood that the Bluetooth mesh network 100 may further include more mesh nodes as shown in FIG. 1. Details are not described herein.

As shown in FIG. 2, the mesh gateway 110 may be connected to a Wi-Fi router 310, and implement communication with a Wi-Fi network (or a device) and another network (or a network device) by using the Wi-Fi router 310.

In an example embodiment, FIG. 2 shows a ZigBee network 200. The ZigBee network 200 includes a ZigBee gateway 210 and a ZigBee device 220. In this scenario, the mesh node 111 is connected to the Wi-Fi router 310 by using the mesh gateway 110, and the ZigBee device 220 is connected to the Wi-Fi router 310 by using the ZigBee gateway 210. Therefore, the mesh node 111 and the ZigBee device 220 may communicate with each other by using the Wi-Fi router 310.

In another example embodiment, FIG. 2 further shows a Wi-Fi device 320. In this scenario, the mesh node 111 is connected to the Wi-Fi router 310 by using the mesh gateway 110, and the Wi-Fi device 320 is also connected to the Wi-Fi router 310. Therefore, the mesh node 111 and the Wi-Fi device 320 may communicate with each other by using the Wi-Fi router 310.

In another example embodiment, FIG. 2 further shows a terminal. For example, FIG. 1 specifically shows two representation forms of the terminal: a tablet computer 410 and a mobile phone 420. In this embodiment of this application, the terminal may be further represented in another form. For example, the terminal may further include a terminal having a Wi-Fi access function, such as a notebook computer, a palmtop computer, a mobile Internet device (mobile Internet device, MID), a smart speaker, or a smart television. In this scenario, the terminal may communicate with the Wi-Fi router 310. Therefore, the mesh node 111 may communicate with the mobile phone 420 and the tablet computer 410 by using the mesh gateway 110 and the Wi-Fi router 310.

In another example embodiment, FIG. 2 further shows a smart home cloud 500. As shown in FIG. 2, the smart home cloud 500 may communicate with the terminal and the Wi-Fi router 310. Therefore, the mesh node 111 may communicate with the smart home cloud 500 by using the mesh gateway 110 and the Wi-Fi router 310.

In a possible smart home cloud scenario, the mesh network 100, the ZigBee network 200, the terminal (410, 420, and the like), the smart home cloud 500, and the Wi-Fi device 320 may implement global communication by using the Wi-Fi router 310. In addition, in the smart home scenario shown in FIG. 2, in this embodiment of this application, the terminal may communicate with the smart home cloud 500 by using the Wi-Fi router 310 or mobile data.

It should be understood that a quantity and a type of electronic devices included in the communications system shown in FIG. 2 are merely examples, and this embodiment of this application is not limited thereto. For example, more mesh nodes 110 that communicate with the terminal may be further included. For brief description, details are not described in the accompanying drawings. For another example, a core network node, a device configured to bear a virtualized network function, or the like may be further included. These are obvious to a person skilled in the art. Details are not described herein.

In the foregoing Bluetooth mesh network 100, mesh nodes communicate with each other after encrypting information by using the network key (NetKey). Specifically, each mesh node may store NetKey. As described above, the configuration client is responsible for network-wide configuration, which may specifically include but is not limited to configuration of NetKey. However, NetKey is usually configured by the configuration client (or the configuration node) and synchronized in the entire network. Each mesh node (including the mesh gateway) can normally communicate with another mesh node only when NetKey of the mesh node is consistent with global NetKey.

According to the Bluetooth mesh 1.0 specification, when NetKey and/or an application key (AppKey) have/has a leakage risk, for example, when a mesh node is deleted from a Bluetooth mesh network, NetKey and AppKey of the entire network may be updated in a key refresh procedure. Before the key refresh procedure is performed, the configuration client may add a mesh node with a leakage risk to a blacklist (or referred to as a key update blacklist). The mesh node in the blacklist cannot learn of a new key (including NetKey, and in addition, may further include another key, for example, AppKey).

Figure 3:
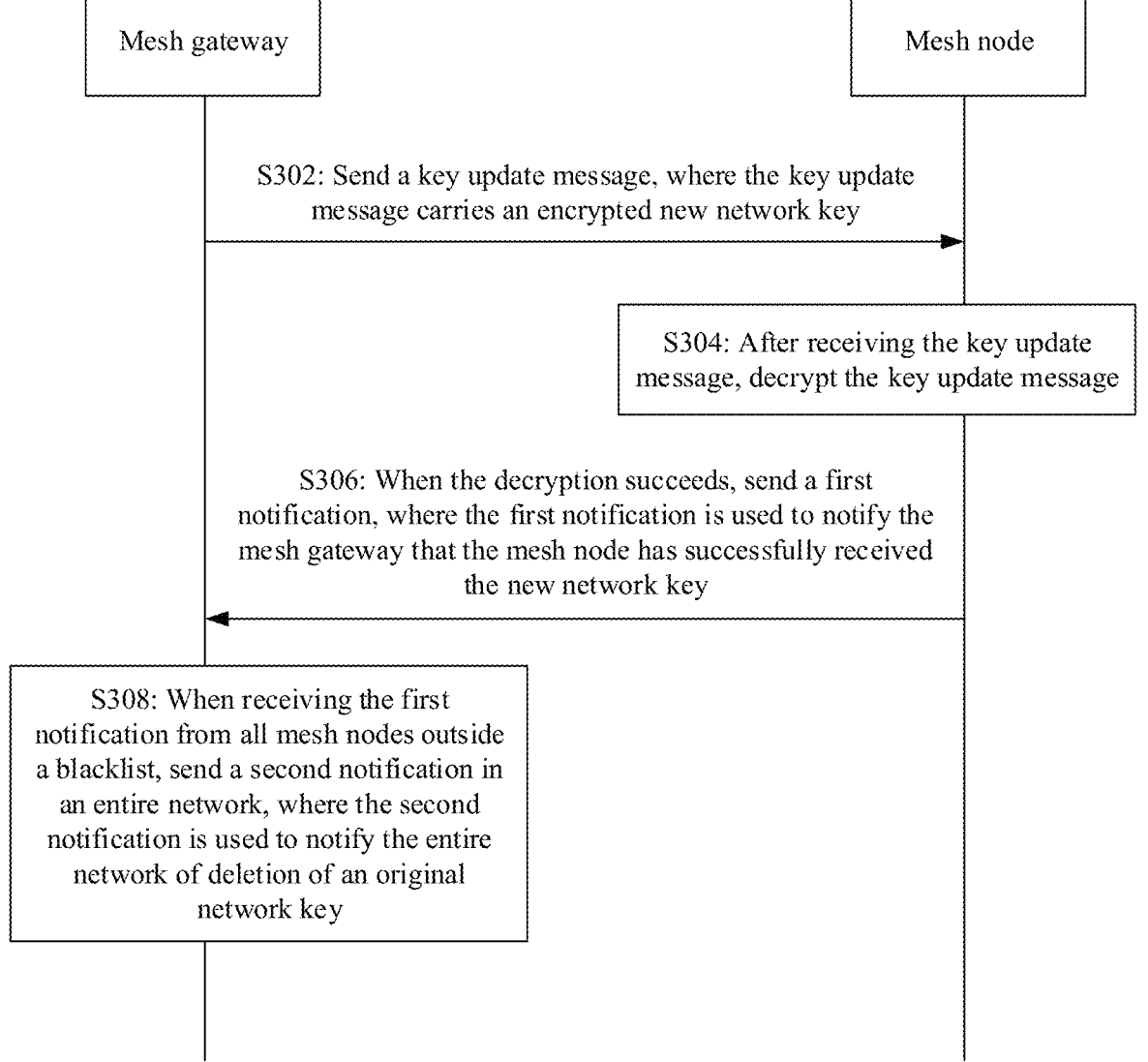
FIG. 3 is a schematic diagram of message exchange in a key update method in the conventional technology.

For example, refer to a schematic diagram of message exchange in a key refresh procedure in the conventional technology shown in FIG. 3. The key refresh procedure mainly involves message exchange between a configuration client and each mesh node outside the blacklist. In FIG. 3, the configuration client is specifically a mesh gateway. FIG. 3 schematically shows a message exchange process performed during NetKey update between the mesh gateway and one mesh node.

As shown in FIG. 3, during update of NetKey of the entire network, the key refresh procedure includes the following steps.

S302: The mesh gateway sends a key update message to the mesh node, where the key update message carries an encrypted new network key.

The key update message carries a second ciphertext, and the second ciphertext uses a double encryption mechanism. The second ciphertext is obtained by doubly encrypting a first network key (that is, the new network key) by using an original network key (original NetKey may further be denoted as a second network key) and a device key (DevKey) of the mesh node. Specifically, the key update message is encrypted by using original NetKey at a network layer, and encrypted by using DevKey of the mesh node at a model layer.

In the key refresh procedure shown in FIG. 3, the mesh gateway may send, to each mesh node outside the blacklist, the key update message encrypted by using DevKey of the mesh node and original NetKey.

In a Bluetooth mesh network, the key update message may arrive at the mesh node within one or more hops. For example, in the Bluetooth mesh network shown in FIG. 1, the mesh gateway 110 may directly send new NetKey to the mesh node 114 (one-hop arrival). When the mesh gateway 110 sends new NetKey to the mesh node 112, new NetKey may be forwarded by the mesh node 114 (two-hop arrival).

Specifically, the key update message may be specifically sent by using a configuration model (Config Model). It may be understood that the key update message is used to update NetKey of the Bluetooth mesh network. A naming manner of the key update message is not particularly limited in this embodiment of this application. For example, the key update message may be a Config Network Key Update message.

In addition, the mesh gateway further sends a Config Key Refresh Phase Set message of the Config Model with a Transaction value of 2 to the mesh node. When the Transaction value of the Config Key Refresh Phase Set message is 2, the message is used to indicate that the mesh node may encrypt a message and send the message by using new NetKey, and the mesh node may decrypt a message by using new NetKey or original NetKey.

It should be noted that a meaning of the Config Key Refresh Phase Set message varies with the Transaction value carried in the Config Key Refresh Phase Set message. The Config Key Refresh Phase Set message with a Transaction value of 3 is also involved below. Details are described below.

S304: The mesh node decrypts the key update message.

As described above, the key update message is sent after new NetKey is doubly encrypted by using original NetKey and DevKey of the mesh node. Therefore, after receiving the key update message, the mesh node may decrypt the second ciphertext carried in the key update message by using original NetKey and DevKey of the mesh node. That is, when receiving the key update message, the mesh node decrypts the key update message by using original NetKey at the network layer, and decrypts the key update message by using DevKey of the mesh node at the model layer. It may be understood that if both decryption succeeds, the mesh node can obtain new NetKey.

S306: When the decryption succeeds, the mesh node sends a first notification to the mesh gateway, where the first notification is used to notify the mesh gateway that the mesh node has successfully received the new network key.

In this case, the mesh node learns of new NetKey, and original NetKey is not deleted. At a current stage, in a Bluetooth mesh network, a mesh node at a transmit end may encrypt data by using new NetKey and then send the encrypted data, and a mesh node at a receive end may decrypt the encrypted data by using new NetKey or original NetKey.

During specific implementation of the key refresh procedure shown in FIG. 3, the first notification is sent by using the Config Model. Specifically, the first notification is specifically a Config NetKey States message.

S308: When receiving the first notification from all mesh nodes outside the blacklist, the mesh gateway sends a second notification in the entire network, where the second notification is used to notify the entire network of deletion of the original network key.

Specifically, before the mesh nodes receive the second notification, the mesh nodes may communicate with another mesh node by using original NetKey or new NetKey. After the mesh nodes receive the second notification, the mesh nodes may delete original NetKey, and use only new NetKey to communicate with another mesh node.

The second notification is also sent by using the Config Model. Specifically, the second notification is specifically the Config Key Refresh Phase Set message with a Transaction value of 3. When the transaction value of the Config Key Refresh Phase Set message is 3, the message (that is, the second notification) is used to indicate that the mesh nodes may use only new NetKey for communication. In other words, original NetKey is deleted.

Further, after receiving the Config Key Refresh Phase Set message with the Transaction value of 3, the mesh nodes may further feed back a Config Key Refresh Phase States message to the mesh gateway. The Config Key Refresh Phase States message is used to indicate that the mesh nodes (the mesh nodes) have completed key update setting.

The Bluetooth mesh network 100 shown in FIG. 1 is used as an example to describe the key refresh procedure. In the embodiment shown in FIG. 1, the mesh gateway 110 is used as a configuration client to distribute a key update message to the mesh node 111 to the mesh node 117. Therefore, for any one of the mesh node 111 to the mesh node 117, using the mesh node 111 as an example, the mesh node 111 receives the key update message, decrypts the key update message by using original NetKey stored in the mesh node 111, and obtains new NetKey after the decryption succeeds. Then, the mesh node 111 sends a Config NetKey States message (that is, a first notification) to the mesh gateway 110.

In addition, the mesh gateway 110 may further send a Config Key Refresh Phase Set message with a Transaction value of 2 to the mesh nodes. The mesh node 111 is used as an example. After the mesh node 111 receives the Config Key Refresh Phase Set message with the Transaction value of 2, the mesh node 111 sends a Config Key Refresh Phase States message to the mesh gateway. In this stage, when sending a message to another mesh node, the mesh node 111 encrypts the message by using new NetKey and then sends the message. When receiving a message from the another mesh node, the mesh node 111 decrypts the message by using the new NetKey or original NetKey.

Until the mesh gateway 110 receives Config Key Refresh Phase States messages from all mesh nodes, that is, when the mesh gateway 110 receives the Config Key Refresh Phase States message respectively from the mesh node 111 to the mesh node 117, the mesh gateway 110 sends the Config Key Refresh Phase Set message (a second notification) with a Transaction value of 3 to the mesh node 111 to the mesh node 117, to delete original NetKey. In this way, NetKey is updated in the entire network.

It should be noted that, in the key refresh procedure shown in FIG. 3, before step S308 is performed, the mesh gateway needs to determine that all mesh nodes outside the blacklist have successfully received new NetKey, that is, after the mesh gateway receives the first notification from all mesh nodes outside the blacklist, the mesh gateway sends the second notification in the entire network.

Based on this, when a mesh node outside the blacklist fails to send the first notification to the mesh gateway due to a reason, the mesh gateway cannot receive the first notification from the mesh node.

For ease of description, in subsequent description, the mesh node (or the mesh node) outside the key update blacklist and that fails to send the first notification in the key refresh procedure is referred to as a first network node (or a first network node). The first network node may fail to send the first notification to the mesh gateway due to one or more of the following reasons: The first network node is in a sleep state, a battery problem, a fault of the first network node, communication interference, or the first network node is removed from a coverage area of the Bluetooth mesh network. A case in which the first network node fails to successfully send the first notification may include: The first network node fails to successfully receive the key update message, and/or the first network node cannot send the first notification to the outside.

In this case, the mesh gateway may continuously wait until receiving first notifications from all mesh nodes outside the blacklist, and then the mesh gateway performs S308 to complete the key refresh procedure.

The Bluetooth mesh network 100 shown in FIG. 1 is used as an example. If the mesh node 113 cannot send a first notification (Config NetKey States) due to a communication interference problem after receiving a key update message, the mesh gateway 110 cannot receive the first notification from the mesh node 113, the mesh gateway 110 keeps waiting until communication of the mesh node 113 is recovered, and the mesh node 113 sends the first notification to the mesh gateway 110. In this way, the mesh gateway 110 may receive the first notification from each of the mesh node 111 to the mesh node 117, and therefore the mesh gateway 110 publishes a second notification in the entire network, to implement key update.

However, in the Bluetooth mesh network, the key refresh procedure is generally started based on a risk of key leakage. For example, the key refresh procedure is started when a mesh node is removed from the network. For another example, when a new mesh node joins the network, the key refresh procedure shown in FIG. 3 may alternatively be started. In this case, a longer waiting time of the mesh gateway in the key refresh procedure indicates a higher probability that the Bluetooth mesh network is attacked by a trash-can, and a higher security risk.

Even in some possible cases, the first network node may always be unable to resolve a fault problem. In this case, the first network node always fails to successfully send the first notification to the mesh gateway. Then, if the mesh gateway keeps waiting, the key refresh procedure may always fail to be completed. This greatly affects security of the Bluetooth mesh network.

In addition to the foregoing key update method, currently, provisioning (provisioning) on the first network node may further be performed by maintenance personnel, so that the first network node re-accesses the network. Therefore, the first network node can obtain a latest network key after re-accessing the network. However, this key update method requires manual participation of the maintenance personnel in implementation, and a process of performing the provisioning for network access involves a tedious and complex operation, and a problem of poor timeliness exists. Therefore, a security risk also exists.

The following describes technical solutions in embodiments of this application in detail by using specific embodiments. These technical solutions may provide an updated network key for a mesh node that misses a key update, which improves security of a Bluetooth mesh network. The following several specific embodiments may be combined with each other, and a same or similar concept or process may not be described repeatedly in some embodiments. The following describes embodiments of this application with reference to the accompanying drawings.

An embodiment of this application provides a key update method. The method may be applied to a Bluetooth mesh network, and is used to implement a key update of the Bluetooth mesh network.

In this embodiment of this application, a configuration client may be a long power supply node in the Bluetooth mesh network. For ease of description, a mesh node that undertakes a network-wide configuration function is briefly referred to as a configuration node. As described above, the configuration node may be specifically a mesh gateway in the Bluetooth mesh network, or the configuration node may be specifically another long power supply node other than the mesh gateway. For example, in the scenario shown in FIG. 1, the configuration node may be the mesh gateway 110, or the configuration node may be the mesh node 117 or the mesh node 114.

For ease of description, one configuration node and one mesh node other than the configuration node are used as an example below to describe this solution.

In this embodiment of the present invention, for a key refresh procedure of a Bluetooth mesh network, refer to FIG. 4. The process may specifically include the following steps.

S402: The configuration node sends a key update message to the mesh node, where the key update message carries an encrypted new network key.

Specifically, the key update message is obtained by encrypting new NetKey by using original NetKey and DevKey of the mesh node. A network layer of the key update message is encrypted by using original NetKey, and a model layer of the key update message is encrypted by using DevKey of the mesh node.

It may be understood that, in an actual scenario, the configuration node may separately send the key update message to each mesh node other than the configuration node.

S404: After receiving the key update message, the mesh node decrypts the key update message.

That is, the mesh node decrypts the key update message by using original NetKey and DevKey of the mesh node.

S406: When the decryption succeeds, the mesh node sends a first notification to the configuration node, where the first notification is used to notify the configuration node that the mesh node has successfully received the new network key.

For implementations of S402 to S406 in FIG. 4, refer to related descriptions of S302 to S306 in FIG. 3. Details are not described herein again.

S408: When timing duration reaches preset duration, or when a current moment reaches a preset moment, the configuration node sends a second notification in the entire network, where the second notification is used to notify the entire network of deletion of the original network key.

A start point of the timing duration is a moment at which the configuration node sends the key update message in S402.

In other words, in the embodiment shown in FIG. 4, after sending the key update message, the configuration node may start timing. When the timing duration reaches the preset duration (or referred to as waiting duration or timeout duration), or when the current moment reaches the preset moment, the configuration node sends the second notification to the outside, to notify the entire network of the deletion of the original network key. In this way, timing processing on the configuration node side enables all mesh nodes to complete, regardless of whether all mesh nodes receive new NetKey, the key refresh procedure within the preset duration (or the preset moment). This reduces a security risk caused by continuous waiting of the configuration node for a feedback of the mesh node.

However, in the key refresh procedure shown in FIG. 4, there may be a mesh node that fails to successfully send the first notification to the configuration node due to a reason, that is, a first network node. Therefore, based on the key refresh procedure shown in FIG. 4, this embodiment of this application further provides a key recovery process for the first network node.

The first network node in this embodiment of this application is some mesh nodes that are in the Bluetooth mesh network and whose network keys locally maintained after the key refresh procedure are inconsistent with a first network key of a current Bluetooth mesh network.

It should be understood that the "key recovery process" is actually a key refresh procedure for the first network node, and the name is merely used to distinguish between key refresh procedures for all mesh nodes in the Bluetooth mesh network. In an actual implementation scenario, the key recovery process for the first network node may be considered as a part of the key refresh procedure. For ease of differentiation and description, the key refresh procedure for all mesh nodes (all mesh nodes outside a blacklist and except the configuration node) shown in FIG. 4 is briefly referred to as a key refresh procedure below, and the key refresh procedure performed for the first network node is briefly referred to as a key recovery process below.

Specifically, when key recovery is performed for the first network node, the first network node may obtain the new network key through message exchange between the first network node and the configuration node.

When the first network node performs message exchange with the configuration node, a Config Model message may be encrypted by using a device key (DevKey) of the first network node. Each mesh node has unique DevKey, and DevKey of the mesh node can be obtained only by the mesh node and the configuration node. Therefore, when the Config Model message is encrypted by using DevKey of the first network node, only the first network node and the configuration node can successfully decrypt the message. This helps improve security of the message exchange in the key recovery process.

Specifically, the key recovery process may be triggered by the configuration node based on an update failure list. Alternatively, the first network node may send a key recovery request to the configuration node, so that the configuration node implements the key recovery process in response to the received key recovery request.

The following describes two implementations of the key recovery process.

In a first key recovery manner, the configuration node actively triggers the foregoing key recovery process based on the update failure list.

The update failure list is used to record a mesh node that experiences an update failure in the key refresh procedure. Specifically, the update failure list may record a node identifier of the mesh node that experiences the update failure. The node identifier may include but is not limited to a MAC address, a mesh address, a customized number, and the like. The customized number may be one or a combination of text, a character, and a number. Details are not described.

Therefore, this key update manner may be implemented after the key refresh procedure shown in FIG. 4.

The update failure list may be recorded and maintained by the configuration node. In the Bluetooth mesh network, the configuration node is responsible for the network-wide configuration. Therefore, the configuration node may learn of mesh nodes included in the current Bluetooth mesh network. On this basis, the configuration node may determine, based on the first notification received in the key refresh procedure, mesh nodes that do not feed back the first notification in time.

Based on this, in a possible embodiment, in addition to performing the key refresh procedure shown in FIG. 4, the configuration node may further obtain identifiers of the mesh nodes that do not feed back the first notification in time, and record the identifiers of these mesh nodes in the update failure list. In this embodiment, the update failure list records all mesh nodes (including a long power supply node and an LPN) that fail to be updated in the entire Bluetooth mesh network.

Because the update failure list is for all mesh nodes (including the long power supply node and the LPN), the configuration node obtains all the long power supply nodes in the update failure list, and uses all the long power supply nodes in the update failure list as first network nodes. Therefore, the configuration node performs key recovery for each first network node.

In this embodiment of this application, the configuration node actively performs the key recovery on the long power supply node, and for the LPN that misses a key update, the configuration node may implement the key recovery in response to a key recovery request from the LPN. Details are described below. In this way, the long power supply node and the LPN that miss the key refresh procedure are processed differently, to avoid a possibility that the LPN in a sleep state misses the key recovery process initiated by the configuration node. This helps shorten duration of the key recovery process, improve key recovery efficiency, and save system resources.

In this scenario, the configuration node may determine the first network node (or referred to as a target node or a target mesh node) based on the update failure list. Therefore, the configuration node may encrypt the first network key by using DevKey of the first network node, to obtain a first ciphertext, where the first network key is a current network key of the Bluetooth mesh network. Then, the configuration node sends a message 1 to the first network node, so that the first network node can decrypt the first ciphertext carried in the message 1, and the first network node can obtain the first network key. In the Bluetooth mesh network, the message 1 may arrive at the first network node in one hop or arrive at the first network node through multi-hop relay forwarding of another mesh node, and the message 1 may be carried in a Beacon frame.

Figure 5:
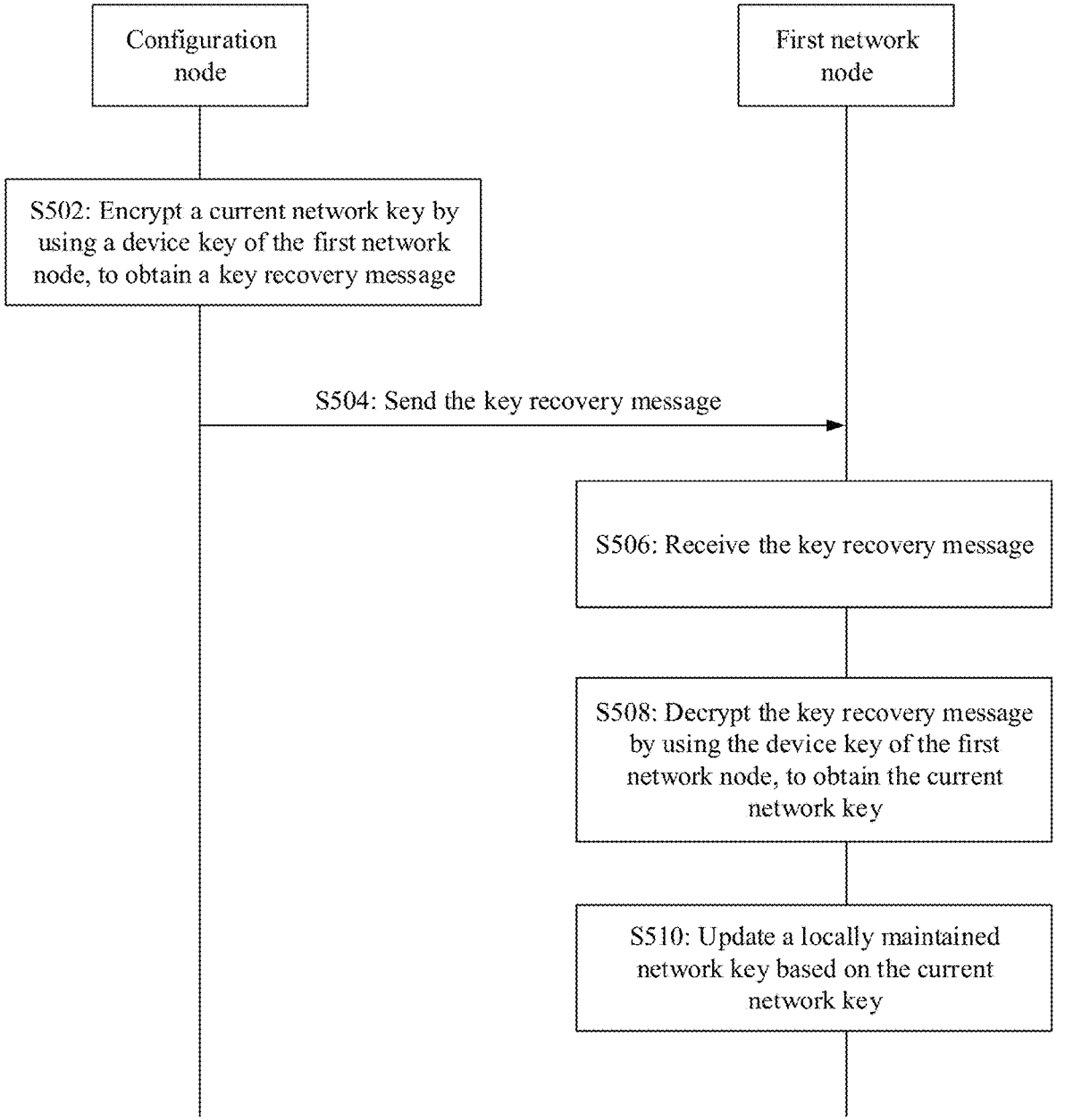
FIG. 5 is a schematic diagram of message exchange in a key recovery method according to this application.

For example, refer to FIG. 5. The key recovery process may include but is not limited to the following steps.

S502: The configuration node encrypts the current network key by using the device key of the first network node, to obtain a key recovery message.

The key recovery process shown in FIG. 5 is performed after the key refresh procedure shown in FIG. 4, and is used to perform key recovery on some mesh nodes that fail to update NetKey in the key refresh procedure. In this case, all long power supply nodes in some mesh nodes that fail to update NetKey are used as the first network node, to perform the key recovery process shown in FIG. 5. In this case, the current network key mentioned in this step may be specifically the new network key in FIG. 4.

In this case, the current network key of the Bluetooth mesh network is the first network key, the key recovery message carries the first ciphertext, and the first ciphertext is obtained by encrypting the first network key by using DevKey of the first network node.

S504: The configuration node sends the key recovery message to the first network node.

During specific implementation, the key recovery message is the message 1 described above. In this embodiment of this application, the configuration node may send the key recovery message to the outside in a broadcast manner. In this case, the key recovery message (that is, the message 1) carries an identifier of the first network node. In this way, in the Bluetooth mesh network, the key recovery message may arrive at the first network node in one hop or arrive at the first network node through multi-hop relay forwarding of another mesh node.

S506: The first network node receives the key recovery message (that is, the message 1).

S508: The first network node decrypts the key recovery message by using the device key of the first network node, to obtain the current network key.

The current network key is the first network key. During specific implementation of this step, the first network node decrypts, by using DevKey of the first network node, the first ciphertext carried in the message 1, to obtain the first network key of the current Bluetooth mesh network.

S510: The first network node updates the locally maintained network key based on the current network key.

Because the first network node misses the key refresh procedure, the network key locally maintained by the first network node is inconsistent with the current network key of the Bluetooth mesh network. Therefore, when performing this step, the first network node only needs to update the locally maintained network key to the current network key of the Bluetooth mesh network.

For example, the network key locally maintained by the first network node is a key 1, and power of the first network node is exhausted. In this case, the first network node cannot communicate with the Bluetooth mesh network, and misses the key refresh procedure of the Bluetooth mesh network. During this period, the network key of the Bluetooth mesh network is updated for three times, which are sequentially key 1, key 2, key 3 and key 4. After the first network node replaces a battery, the current network key of the Bluetooth mesh network in the Bluetooth mesh network is the key 4. In this case, during implementation of the foregoing process in FIG. 5, the first network node may decrypt the key recovery message based on DevKey of the first network node, to obtain the key 4, and replace the locally maintained key 1 with the key 4, so as to update the key.

FIG. 5 is only a schematic diagram of an interaction process between one first network node and the configuration node. In an actual scenario, a case in which a plurality of first network nodes exist in the Bluetooth mesh network may be involved. In this case, the key recovery process shown in FIG. 5 may be performed for each first network node, to implement key recovery for each first network node. In other words, the key recovery process shown in FIG. 5 is implemented for a single first network node. When there are a plurality of first network nodes, the key recovery process only needs to be performed for a plurality of times.

It may be understood that when there are a plurality of first network nodes, DevKey of the first network nodes is different, and first ciphertexts obtained in this step are different, that is, information (the first ciphertexts) carried in the key recovery message is different.

It should be noted that the schematic diagram of interaction shown in FIG. 5 is merely an example. When the key recovery method is actually applied to the Bluetooth mesh network, multi-hop forwarding may be required to implement the interaction between the first network node and the configuration node.

Figure 6:
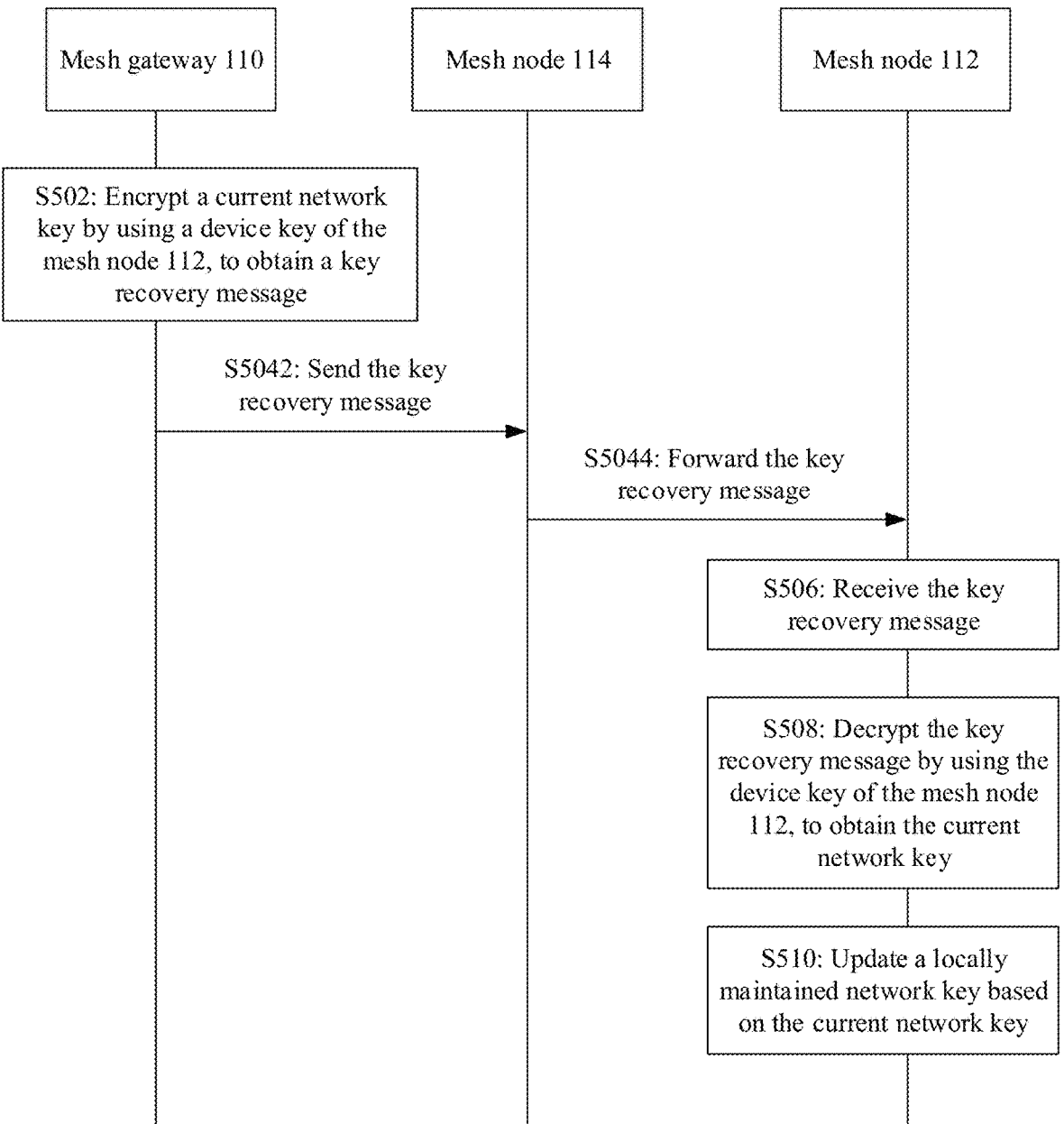
FIG. 6 is a schematic diagram of message exchange in another key recovery method according to this application.

For example, FIG. 6 shows a key recovery method for a long power supply node. Specifically, FIG. 6 is a schematic diagram of an implementation in which the key recovery method shown in FIG. 5 is applied to the Bluetooth mesh network shown in FIG. 1. FIG. 6 schematically shows the mesh node 112 (a first network node), the mesh node 114, and the mesh gateway 110 (a configuration node). In this case, a key recovery message sent by the mesh gateway 110 to the mesh node 112 needs to be forwarded by the mesh node 114 to arrive at the mesh node 112.

For example, in another embodiment, in the Bluetooth mesh network shown in FIG. 1, the configuration node may be the mesh node 117, that is, the mesh node 117 undertakes a network-wide configuration function.

Then, if the first network node is the mesh gateway 110, the mesh node 117 may send a message 1 (a key recovery message) to the outside, where the key recovery message carries an identifier of the mesh gateway 110. In this case, the key recovery message arrives at the first network node in one hop.

Alternatively, if the first network node is the mesh node 114, the mesh node 117 sends a message 1 (a key recovery message) to the outside, where the key recovery message carries an identifier of the mesh node 114. In this case, the key recovery message may arrive at the mesh node 114 through relay forwarding of the mesh gateway 110. Details are not described herein.

In the foregoing key recovery method, each broadcast message, for example, the key recovery message (that is, the message 1) and a message 2 described below, further carries a receive end identifier. The receive end identifier is used to uniquely indicate a receive end of the broadcast message. Specifically, the receive end identifier may include but is not limited to a physical media access control (MAC) address of the receive end.

In this way, in the Bluetooth mesh network, for any mesh node, after receiving the key recovery message, the mesh node may determine, based on the receive end identifier (the MAC address) carried in the key recovery message, whether the mesh node is the receive end of the key recovery message. When the MAC address carried in the key recovery message is consistent with a MAC address of the mesh node, the mesh node is the receive end of the key recovery message. On the contrary, if the MAC address carried in the key recovery message is inconsistent with the MAC address of the mesh node, the mesh node is not the receive end of the key recovery message.

Therefore, when the mesh node is not the receive end of the key recovery message, if the mesh node is a relay node, the mesh node forwards the key recovery message. If the mesh node is not a relay node, the mesh node discards the key recovery message. When the mesh node is the receive end of the key recovery message, the mesh node decrypts the key recovery message by using DevKey of the mesh node.

For example, in the key recovery process shown in FIG. 6, after receiving a key recovery message, the mesh node 114 determines that the mesh node 114 is not a receive end of the key recovery message and is a relay node, and the mesh node 114 forwards the key recovery message to the mesh node 112. After receiving the key recovery message, the mesh node 112 determines that the mesh node 112 is the receive end of the key recovery message, decrypts the key recovery message to obtain a current network key of the Bluetooth mesh network, and further updates a locally maintained network key to complete key recovery.

In this embodiment of this application, the key recovery message (the message 1) may be specifically a configuration broadcast frame (Beacon). In this case, the configuration broadcast frame carries the first ciphertext obtained after the current NetKey is encrypted by using DevKey of the first network node.

In addition, it should be noted that in a scenario in which the configuration node actively performs the key recovery for the first network node, the configuration node may send the key recovery message to the first network node for a plurality of times.

For example, in an embodiment, the configuration node may send the key recovery message to the first network node intermittently, for example, periodically, until a heartbeat from the first network node is received. The "heartbeat" of the first network node refers to a message sent by the first network node to the outside, to notify another node that the first network node is in an active state. A message type of the "heartbeat" may be a broadcast message, or may be a unicast message. The "heartbeat" may not carry data. For example, content carried in the message is empty. Alternatively, another existing message may be used as the "heartbeat", for example, the first notification or another information request message sent by the first network node to the configuration node.

For example, in another embodiment, the configuration node may periodically send the key recovery message to the first network node until a quantity of sending times reaches a preset quantity threshold or a heartbeat is received. The quantity threshold may be preset based on a requirement. This is not particularly limited.

In a second key recovery manner, the first network node sends a key recovery request to the configuration node, and correspondingly, the configuration node responds to the received key recovery request to implement key recovery.

In this implementation, the configuration node does not need to actively perform key recovery for the first network node, but the first network node actively requests the key recovery. This implementation is applicable to a key recovery process of the LPN. In other words, the first network node is the LPN. Considering that the LPN may be in a sleep state, an implementation in which the LPN actively requests the key recovery is more conducive to saving system resources. Details are described below.

The key recovery process performed for the LPN (that is, the first network node) is now described with reference to a processing procedure shown in FIG. 7.

As described above, the LPN switches between a sleep state and an awake state. The LPN may wake up (enter the awake state) or fall asleep (enter the sleep state) periodically. For example, in FIG. 7, the LPN may periodically enter the awake state from the sleep state.

Each LPN has one friend node, that is, a node that has established a friend relationship with the LPN. The friend node is a long power supply node in a Bluetooth mesh network, and is configured to temporarily store a message for the LPN when the LPN is in the sleep state. For ease of description, a node that has currently established a friend relationship with the LPN (which may be denoted as the first network node) is denoted as the friend node.

Figure 7:
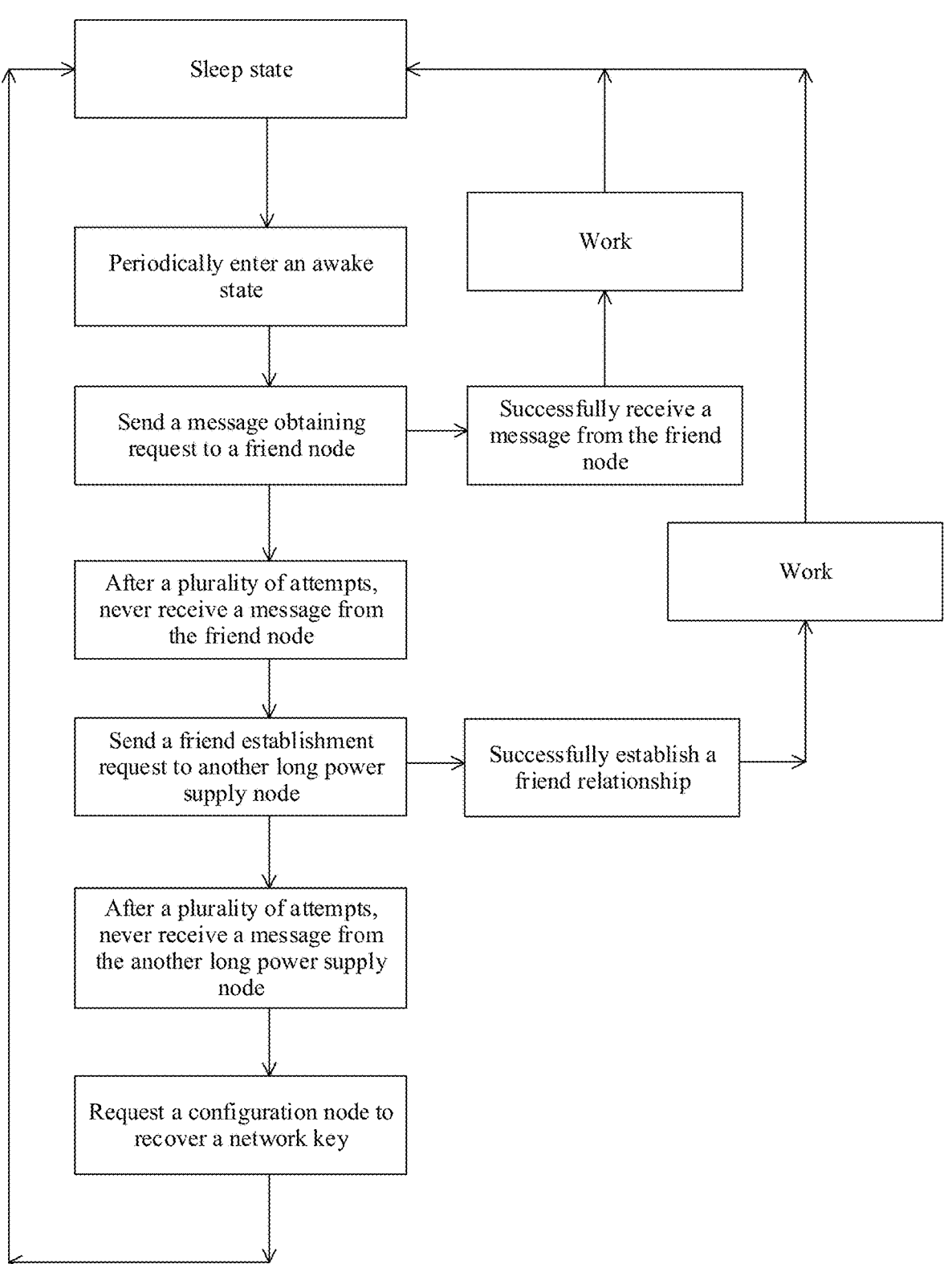
FIG. 7 is a schematic diagram of message exchange in another key recovery method according to this application.

Then, as shown in FIG. 7, when the LPN switches from the sleep state to the awake state, that is, after waking up, the LPN may send a message obtaining request (that is, a fourth message) to the friend node, where the message obtaining request is used to request to obtain the message temporarily stored by the friend node for the LPN during a sleep period of the LPN. For example, the message obtaining request may be specifically a friend poll message.

It should be noted that, when sending the message obtaining request, the LPN needs to encrypt the message obtaining request by using a locally maintained network key. When receiving the message obtaining request, the friend node may decrypt the message obtaining request by using a locally maintained network key.

If the decryption succeeds, the friend node sends, to the LPN, the message temporarily stored by the friend node for the LPN. In this case, the LPN can successfully receive the message from the friend node. In this case, the network key locally maintained by the LPN is the same as the network key of the friend node, and the key recovery process does not need to be started. In this case, after receiving the message temporarily stored by the friend node for the LPN, the LPN may process the message or perform another data processing process. This is not particularly limited in this embodiment of this application. "Work" is represented in FIG. 7. In addition, the LPN may further switch from the awake state to the sleep state (fall asleep periodically) at a scheduled moment or based on a preset period.

However, if network keys respectively maintained by the LPN and the friend node are inconsistent, the decryption fails, and the friend node does not respond to the message obtaining request. That is, the friend node does not feed back, to the LPN, the message temporarily stored for the LPN. In this case, the LPN cannot receive a feedback on the message obtaining request.

In this case, if the LPN does not receive the feedback message from the friend node within preset first duration, the LPN may attempt to send the message obtaining request to the friend node for a plurality of times. For example, when the feedback message from the friend node is not received within the preset first duration after the fourth message is sent, the LPN may periodically send the message obtaining request to the friend node until the feedback message from the friend node is received, or a quantity of sending times reaches a preset first threshold.

If the LPN never receives the message from the friend node after a plurality of attempts, there may be two cases: The network key locally maintained by the LPN expires, or the friend node is faulty. For example, the friend node may be removed from a coverage area of the Bluetooth mesh network, the friend node misses the key refresh procedure, the friend node encounters a communication fault, or the like. Details are not described herein.

In this case, the LPN may attempt to establish a friend relationship with another long power supply node. That is, the LPN selects the another long power supply node as the friend node of the LPN.

In this case, when the quantity of times of sending the fourth message reaches the preset first threshold, and a feedback message from the friend node is never received, the LPN broadcasts a friend establishment request (a fifth message). The friend establishment request is used to request to establish a friend relationship with a network node. For example, the friend establishment request may be specifically a friend request message. It should be noted that the friend request message cannot be forwarded by a relay node, and only a network node in a wireless coverage area of the LPN can process the friend request message.

Similarly, when sending the friend establishment request, the LPN needs to encrypt the friend establishment request by using the locally maintained network key. When receiving the friend establishment request, a long power supply node around the LPN may decrypt the friend establishment request by using a locally maintained network key.

If the decryption succeeds, the long power supply node may establish a friend relationship with the LPN. Establishment of the friend relationship belongs to the conventional technology. Details are not described herein. In this case, after the friend relationship is established, the long power supply node becomes the friend node of the LPN. Then, the LPN may perform work after wakeup, and switch from the awake state to the sleep state (fall asleep periodically) at the scheduled moment or based on the preset period.

If network keys respectively maintained by the LPN and the long power supply node are inconsistent, the decryption fails, and the LPN cannot establish the friend relationship with the long power supply node.

In this case, if the LPN does not receive a feedback message from another network node within preset second duration, the LPN may attempt to establish a friend relationship with the another network node for a plurality of times until the friend relationship is successfully established, or a quantity of times of sending the fifth message reaches a preset second threshold.

If the LPN does not receive a message from the another long power supply node after a plurality of attempts, that is, when the quantity of times of sending the fifth message reaches the preset second threshold, and a feedback message from the another network node is never received, it indicates that the network key locally maintained by the LPN may have expired. In this case, the LPN may actively start the key recovery process. That is, the LPN sends the message 2 to the configuration node, to request to recover a network key (or referred to as requesting to synchronize a current network key). Specific descriptions are provided below with reference to FIG. 8.

After recovering the network key from the configuration node, the LPN may normally communicate with another mesh node, and perform work or wait. FIG. 7 does not specifically show specific processing content of the LPN in the awake state. Then, the LPN may switch from the awake state to the sleep state (fall asleep periodically) at the scheduled moment or according to the preset period.

In this way, in the manner shown in FIG. 7, the LPN can implement active recovery of the network key when the LPN is in the awake state.

Figure 8:
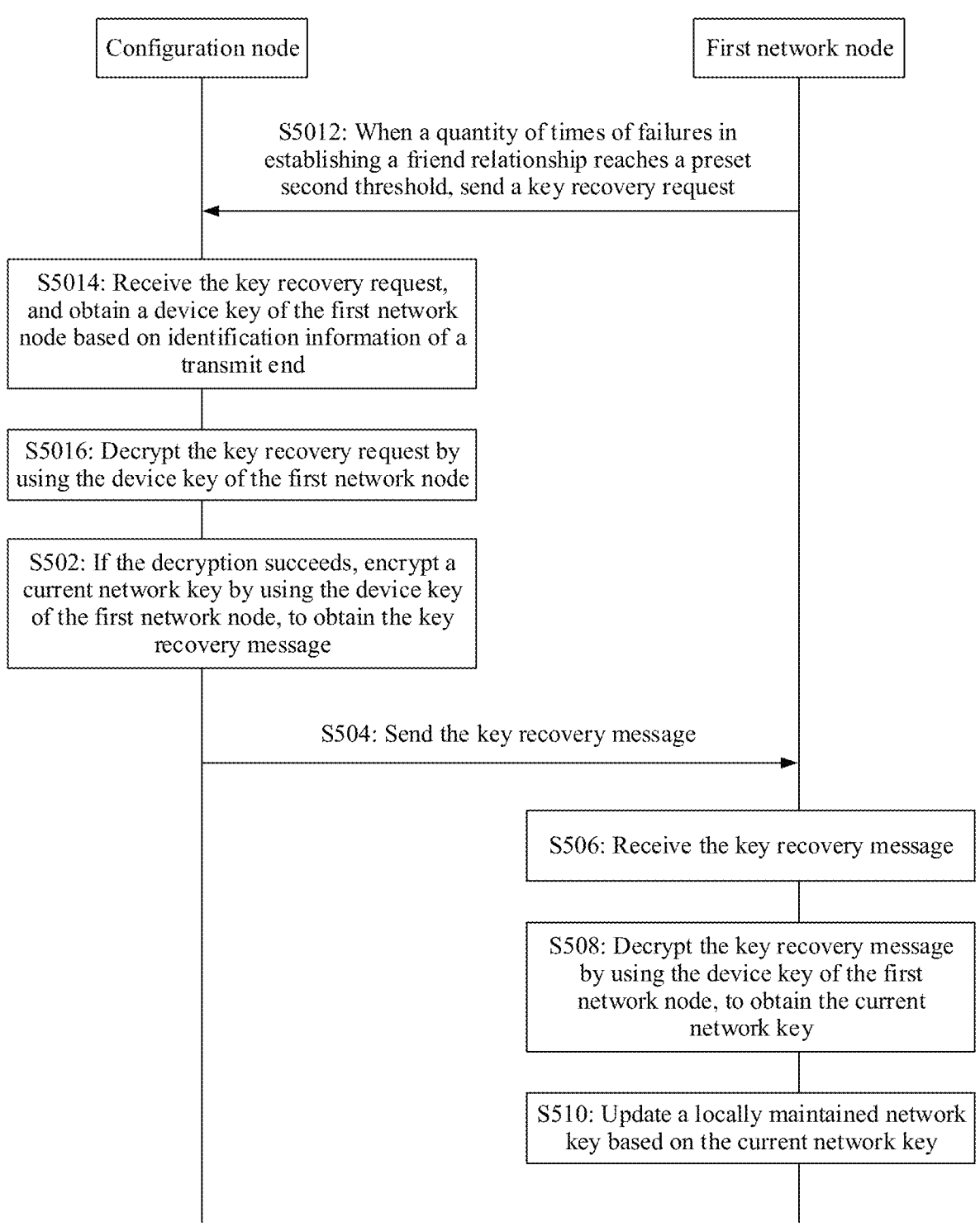
FIG. 8 is a schematic diagram of message exchange in another key recovery method according to this application.

FIG. 8 is a schematic diagram of message exchange in a key recovery process of an LPN. In the embodiment shown in FIG. 8, in addition to steps S502 to S510 in the embodiment shown in FIG. 5, as shown in FIG. 8, before S502, the method further includes the following steps.

S5012: When a quantity of times of failures in establishing a friend relationship reaches a preset second threshold, the first network node sends a key recovery request to the configuration node.

In the key recovery process, the first network node may send the key recovery request in a broadcast manner. In this case, the key recovery request may also be briefly referred to as the message 2. The message 2 (that is, the key recovery request) is used to request the configuration node to recover the network key, or may mean that the message 2 is used to request to synchronize the current network key (that is, the first network key) of the Bluetooth mesh network.

In addition, as described above, a case in which the quantity of times of failures in establishing the friend relationship reaches the preset second threshold is a case in which the quantity of times of sending the fifth message reaches the preset second threshold and a feedback message from another network node is never received. In this case, the first network node sends the message 2 to the configuration node, where the message 2 carries an identifier of the configuration node. For example, the message 2 carries a MAC address of the configuration node.

In consideration of security of a communication process, the key recovery request is sent after being encrypted by using the device key of the first network node. For example, an encryption algorithm may include but is not limited to an AES-CCM algorithm.

In an example embodiment, both the key recovery request (the message 2) and the key recovery message (the message 1) may be Beacon messages. Further, the message 1 and the message 2 may be specifically configuration broadcast frames (configuration Beacon).

S5014: The configuration node receives the key recovery request, and obtains the device key of the first network node based on identification information of a transmit end.

S5016: The configuration node decrypts the key recovery request by using the device key of the first network node.

As described above, the device key of the mesh node is known only by the mesh node and the configuration node. Therefore, if the decryption succeeds, the configuration node may determine that an identity of the first network node is valid, and the configuration node may perform S502 to S510 to implement key recovery for the first network node.

On the contrary, if the decryption fails, the configuration node cannot determine an identity of a transmit end node of the key recovery request, and the configuration node may not feed back the current Bluetooth mesh network key to the transmit end node.

In addition, similar to the key recovery message mentioned in FIG. 5, the key recovery request may implement one-hop interaction, for example, message exchange between the mesh node 111 and the mesh gateway 110 in FIG. 1. Alternatively, the key recovery request may arrive at the configuration node through multi-hop forwarding of a plurality of mesh nodes.

Figure 9:
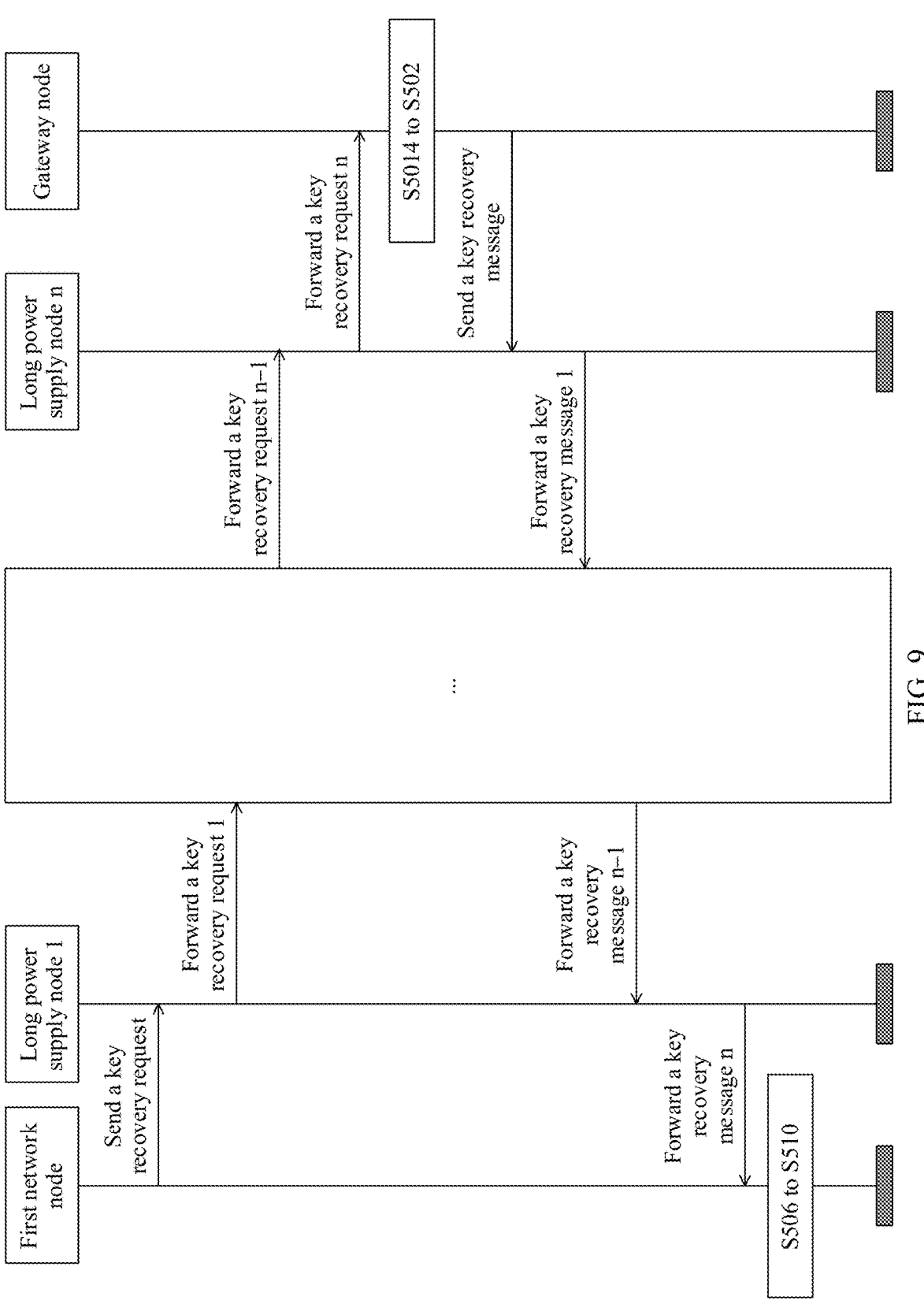
FIG. 9 is a schematic diagram of message exchange in another key recovery method according to this application.

For example, FIG. 9 is specifically a schematic diagram of a case in which the message arrives at a receive end through multi-hop forwarding in S5012 and S504 in FIG. 8. Processing of other steps in FIG. 8 is omitted in FIG. 9. FIG. 9 specifically shows the first network node (the LPN), n long power supply nodes, and a gateway node (the configuration node), where n is 0 (one-hop direct interaction) or a positive integer (multi-hop forwarding). In the embodiment shown in FIG. 9, in step S5012, after the first network node sends the key recovery request to the outside, the key recovery request is forwarded by the long power supply node 1 to the long power supply node n for n times, and the key recovery request arrives at the gateway node through n-hop forwarding. In step S504, when the gateway node sends the key recovery message to the first network node, the key recovery message is also forwarded by the long power supply node n to the long power supply node 1 for n times, and the key recovery message arrives at the gateway node through n-hop forwarding.

It should be noted that, in a process in which the first network node actively requests to recover the network key, the first network node may repeatedly perform the procedure shown in FIG. 8 or FIG. 9 for a plurality of times until the first network node can successfully communicate with another mesh node.

For example, in an embodiment, the first network node may periodically send the key recovery request to the configuration node until the feedback message from the friend node can be successfully received after the message obtaining request is sent. In other words, after performing S510 and successfully updating the locally maintained network key, the first network node may send the friend poll to the friend node. If the first network node receives the feedback message from the friend node, the first network node no longer requests to update the network key from the configuration node.

For example, in another embodiment, the first network node may periodically send the key recovery request to the configuration node until a new friend relationship is established. In other words, after successfully updating the locally maintained network key after performing S510, the first network node may send the friend request message to another long power supply node. If a friend relationship is successfully established, the first network node no longer requests to update the network key from the configuration node.

In any one of the foregoing embodiments, for example, in any one of the embodiments shown in FIG. 5, FIG. 8, and FIG. 9, after implementing update synchronization of the local network key based on the received message 1, the first network node may further send a third message to the configuration node, where the third message is used to indicate that the network device has successfully synchronized the first network key, and the third message is, for example, a heartbeat message.

In addition, it should be noted that, in this embodiment of this application, the key recovery process shown in FIG. 8 is performed after the key refresh procedure shown in FIG. 4. A sequence of the key recovery process and the key refresh procedure is limited.

Based on the foregoing processing, a key of any mesh node in the Bluetooth mesh network may be updated. Based on this, on the basis of successfully updating Netkey or successfully recovering NetKey, a mesh node (for example, the first network node) may further update a network-wide encryption index, update an application key, or reset a local sequence number by using the first network key.

For example, any mesh node may update the network-wide encryption index (IV Index) by using a secure broadcast frame (Secure Beacon).

Specifically, the mesh node may update the IV Index by using an IV Index Update process or an IV Index Recovery process. Both the IV Index Update process and the IV Index Recovery process can update the IV Index. The difference lies in that triggering conditions of the IV Index Update process and the IV Index Recovery process are different. For example, when an IV Index in the Secure Beacon received by the mesh node is 1 greater than an IV Index maintained by the mesh node, and an IV Update Flag is 1, the IV Index Update process is started to update the IV Index. The IV Index Recovery is used to update the IV Index except in this case and a case in which an IV Index in the Secure Beacon received by the mesh node is less than or equal to the IV Index maintained by the mesh node. Details are not described herein.

In this application, when the IV Index is updated by using the Secure Beacon, NetKey (for example, updated new NetKey, that is, the first network key) maintained by a current mesh node may be used to encrypt the Secure Beacon, and then message exchange is performed.

In this embodiment of this application, there is no special limitation on a trigger condition and an implementation of a process of updating the IV Index. A related standard in the conventional technology or another disclosed document may be used. Details are not described herein.

In addition to updating the IV Index, the mesh node may further reset a local sequence number (SeqNum) maintained by the mesh node based on the updated NetKey. SeqNum is locally maintained by each mesh node, and SeqNum of mesh nodes may be the same or different.

In this embodiment of this application, there is no special limitation on a trigger condition and an implementation of a process of resetting the SeqNum. A related standard in the conventional technology or another disclosed document may be used. Details are not described herein.

In addition, in this embodiment of this application, the mesh node may further update the application key (AppKey) based on the updated first network key (NetKey).

Specifically, AppKey may be updated by using a configuration model (Config Model). In other words, the mesh nodes may perform information exchange by using the Config Model, to update AppKey. When information exchange is performed by using the Config Model, a transmit end encrypts information by using updated NetKey and DevKey of a receive end.

Similarly, there is no special limitation on a trigger condition and an implementation of a process of updating AppKey. A related standard in the conventional technology or another disclosed document may be used. Details are not described herein.

It may be understood that some or all of the steps or operations in the foregoing embodiments are merely examples. Other operations or variations of various operations may be performed in embodiments of this application. In addition, the steps may be performed in a sequence different from that presented in the foregoing embodiments, and not all operations in the foregoing embodiments may need to be performed.

An embodiment of this application further provides a network device.

For example, this application provides a network device. The network device includes a processing module and a transceiver module. The processing module is configured to: determine a first network node from network nodes of a Bluetooth mesh network, where a network key locally maintained by the first network node is inconsistent with a first network key of a current Bluetooth mesh network, and encrypt the first network key by using a device key of the first network node, to obtain a first ciphertext. The transceiver module is configured to send a first message, so that the first network node obtains the first network key, and the first message carries the first ciphertext.

In a possible embodiment, the transceiver module is further configured to receive a second message, where the second message is used to request to synchronize a network key. In this case, the processing module is specifically configured to: when a network node indicated by a requester identifier carried in the second message is not a deleted node, determine the network node indicated by the requester identifier carried in the second message as the first network node.

In another possible embodiment, the processing module is specifically configured to determine each long power supply node in an update failure list as the first network node, where the update failure list is used to record all network nodes that fail to update a key and that are not deleted nodes in the Bluetooth mesh network, and the long power supply node is a network node other than a low power node in the Bluetooth mesh network.

In another possible embodiment, the network device is a configuration node, and the configuration node is a mesh gateway or another long power supply node.

In another possible embodiment, the first message is a broadcast frame, and the first message carries an identifier of the first network node.

The network device provided in this embodiment may be configured to perform the technical solution on the configuration node side in any one of the foregoing embodiments. For an implementation principle and a technical effect of the network device, further refer to related descriptions in the method embodiments.

For example, an embodiment of this application further provides another network device. The network device includes a processing module and a transceiver module. The transceiver module is configured to: send a second message to a configuration node, where the second message is used to request to synchronize a network key, and receive a first message from the configuration node, where the first message carries a first ciphertext, the first ciphertext is obtained by encrypting a first network key of a Bluetooth mesh network by using a device key of the network device, and a network key locally maintained by the network device is inconsistent with the first network key. The processing module is configured to: decrypt the first ciphertext by using the device key of the network device, to obtain the first network key, and update the locally maintained network key to the first network key.

In a possible embodiment, the transceiver module is further configured to send a third message to the configuration node, where the third message is used to indicate that the network device has successfully synchronized the first network key.

In a possible embodiment, the processing module is further configured to: update a network-wide encryption index, update an application key, or reset a local sequence number by using the first network key.

In a possible embodiment, the transceiver module is specifically configured to: when the network device switches from a sleep state to an awake state, send a fourth message to a second network node, where the second network node has established a friend relationship with the network device, the second network node is configured to temporarily store a message for the network device when the network device is in the sleep state, and the fourth message is used to request to obtain the message temporarily stored by the second network node for the network device; when a quantity of times of sending the fourth message reaches a preset first threshold and a feedback message from the second network node is never received, send a fifth message through broadcast, where the fifth message is used to request to establish a friend relationship; and when a quantity of times of sending the fifth message reaches a preset second threshold and a feedback message from another network node is never received, send the second message to the configuration node.

The network device provided in this embodiment may be configured to perform the technical solution on the mesh node side (including but not limited to the first network node) in any embodiment. For an implementation principle and a technical effect of the network device, refer to related descriptions in the method embodiments.

It should be understood that division into the modules of the foregoing network devices is merely logical function division, and in an actual implementation, some or all of the modules may be integrated into one physical entity, or may be physically separated. In addition, all of the modules may be implemented in a form of software invoked by using a processing element or may be implemented in a form of hardware. Alternatively, some modules may be implemented in the form of software invoked by using the processing element, and some modules are implemented in the form of hardware. For example, the processing module may be an independently disposed processing element, or may be integrated into a communications device, for example, a chip of a mesh device for implementation. In addition, the processing module may be stored in a memory of the communications device in a form of a program to be invoked by a processing element of the communications device to perform a function of each of the foregoing modules. An implementation of another module is similar to the implementation of the processing module. In addition, all or some of these modules may be integrated together, or may be implemented independently. The processing element described herein may be an integrated circuit, and has a signal processing capability. In an implementation process, steps in the foregoing methods or the foregoing modules can be implemented by using a hardware integrated logical circuit in the processing element or by using instructions in a form of software.

For example, the foregoing modules may be configured as one or more integrated circuits for implementing the foregoing method, for example, one or more application-specific integrated circuits (ASIC), one or more microprocessors (digital signal processor, DSP), or one or more field programmable gate arrays (FPGA). For another example, when one of the foregoing modules is implemented in a form of scheduling a program by a processing element, the processing element may be a general-purpose processor, for example, a central processing unit (CPU) or another processor that can invoke the program. For another example, these modules may be integrated together and implemented in a form of a system-on-a-chip (SoC).

An embodiment of this application further provides a network device. The network device includes at least one processor and a memory. The memory stores computer-executable instructions. The at least one processor executes the computer-executable instructions, so that the network device performs the method performed on the configuration node side or the mesh node side (including but not limited to the first network node) in any one of the foregoing embodiments.

The network device may include one or more processors. The processor may also be referred to as a processing unit, and may implement a specific control function. The processor may be a general-purpose processor, a dedicated processor, or the like.

In an optional design, the processor may also store instructions, and the instructions may be run by the processor, so that the network device performs the method corresponding to the configuration node or the mesh node (including but not limited to the first network node) described in the foregoing method embodiments.

In another possible design, the network device may include a circuit. The circuit may implement the sending, receiving, or communication function in the foregoing method embodiments.

Optionally, the network device may include one or more memories. The memory stores instructions or intermediate data, and the instructions may be run on the processor, so that the network device performs the method described in the foregoing method embodiments. Optionally, the memory may further store other related data. Optionally, the processor may also store instructions and/or data. The processor and the memory may be separately disposed, or may be integrated together.

Optionally, the network device may further include a transceiver. The transceiver may be referred to as a transceiver unit, a transceiver machine, a transceiver circuit, a transceiver, or the like, and is configured to implement a transceiver function of the communications device.

If the network device (used as the configuration node) is configured to implement the operation corresponding to the embodiment shown in FIG. 5 in which the configuration node sends the key recovery message to the first network node, for example, the transceiver may send the key recovery message to the first network node, the transceiver may further complete another corresponding communication function. The processor is configured to complete a corresponding determining or control operation, and optionally, may further store corresponding instructions in the memory. For a specific processing manner of each component, refer to related descriptions in the foregoing embodiments.

If the network device (used as the first network node) is configured to implement the operation corresponding to FIG. 8 in which the first network node sends the key recovery request to the configuration node, for example, the transceiver may send the key recovery request to the configuration node, the transceiver may further complete another corresponding communication function. The processor is configured to complete a corresponding determining or control operation, and optionally, may further store corresponding instructions in the memory. For a specific processing manner of each component, refer to related descriptions in the foregoing embodiments.

The processor and the transceiver described in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may also be manufactured by using various 1C process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

Optionally, the communications device may be an independent device or may be a part of a large device. For example, the device may be:

(1) an independent integrated circuit IC, a chip, or a chip system or subsystem;

(2) a set of one or more ICs, where optionally, the IC set may further include a storage component configured to store data and/or instructions;

(3) an ASIC, for example, a modem (MSM);

(4) a module that can be embedded in another device;

(5) a receiver, a terminal, a cellular phone, a wireless device, a handheld phone, a mobile unit, or a network device; or (6) another device or the like.

An embodiment of this application further provides a computer-readable storage medium, where the computer-readable storage medium stores a computer program. When the computer program is run on a computer, the computer is enabled to perform the communication method in the foregoing embodiments.

In addition, an embodiment of this application further provides a computer program product, where the computer program product includes a computer program. When the computer program is run on a computer, the computer is enabled to perform the communication method in the foregoing embodiments.

All or some of the foregoing embodiments may be implemented by using software, hardware, firmware, or any combination thereof. When software is used to implement the embodiments, all or some embodiments may be implemented in a form of a computer program product. The computer program product includes one or more computer instructions. When the computer program or the instructions are loaded and executed on the computer, the procedures or functions according to this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaedxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

What is claimed is:

1. A key update method, applied to a Bluetooth mesh network comprising at least two mesh nodes, wherein a configuration node is a mesh node in the Bluetooth mesh network, wherein the configuration node configures a network key of the Bluetooth mesh network, and the method comprises:

determining, by the configuration node, a first mesh node from the at least two mesh nodes in the Bluetooth mesh network, wherein a first network key locally maintained by the first mesh node is inconsistent with a second network key of the Bluetooth mesh network, and wherein determining the first mesh node includes either receiving a second message used to request to synchronize the network key and determining a mesh node indicated by a requester identifier carried in the second message as the first mesh node based on the mesh node indicated by the requester identifier not being a deleted node, or determining each long power supply node in an update failure list as the first mesh node, wherein the update failure list is records all mesh nodes that fail to update a key and are not deleted nodes in the Bluetooth mesh network, and the long power supply node is a mesh node other than a low power node in the Bluetooth mesh network;

encrypting, by the configuration node, the second network key by using a device key of the first mesh node to obtain a first ciphertext; and sending, by the configuration node, a first message so that the first mesh node obtains the second network key, wherein the first message carries the first ciphertext.

2. The method according to claim 1, wherein the configuration node is a mesh node that functions as a gateway.

3. The method according to claim 1, wherein the first message is a broadcast frame that carries an identifier of the first mesh node.

4. The method according to claim 1, wherein the configuration node is a long power supply node.

5. The method according to claim 1, wherein the first mesh node is a mesh node outside a key update blacklist that fails to send a first notification in a key refresh procedure.

6. A key update method, applied to a Bluetooth mesh network comprising at least two mesh nodes, wherein a configuration node is a mesh node in the Bluetooth mesh network, wherein the configuration node configures a network key of the Bluetooth mesh network, wherein a first mesh node is any mesh node of the at least two mesh nodes other than the configuration node, wherein the first mesh node is a mesh node outside a key update blacklist and that fails to send a first notification in a key refresh procedure, and the method comprises:

sending, by the first mesh node, a fourth message to a second mesh node based on the first mesh node switching from a sleep state to an awake state,
wherein the second mesh node has established a friend relationship with the first mesh node,
wherein the second mesh node is configured to temporarily store a message for the first mesh node when the first mesh node is in the sleep state, and
wherein the fourth message requests obtaining the message temporarily stored by the second mesh node for the first mesh node;
broadcasting, by the first mesh node, a fifth message for requesting to establish a friend relationship,
wherein broadcasting the fifth message is based on a quantity of times of sending the fourth message reaching a preset first threshold and a feedback message from the second mesh node is never received;
sending, by the first mesh node, a second message to the configuration node,
wherein sending the second message is based on a quantity of times of sending the fifth message reaching a preset second threshold and a feedback message from another mesh node is never received, and
wherein the second message is used to request to synchronize the network key;
receiving, by the first mesh node, a first message from the configuration node,
wherein the first message carries a first ciphertext obtained by encrypting a second network key of the Bluetooth mesh network by using a device key of the first mesh node, and
wherein a first network key locally maintained by the first mesh node is inconsistent with the second network key;
decrypting, by the first mesh node, the first ciphertext by using a device key of the second network key to obtain the second network key; and updating, by the first mesh node, the first network key to the second network key.

7. The method according to claim 6, wherein the method further comprises:
sending, by the first mesh node, a third message to the configuration node, wherein the third message is used to indicate the first mesh node has successfully synchronized the second network key.

8. The method according to claim 6, wherein the first message is a broadcast frame that carries an identifier of the first mesh node.

9. The method according to claim 6, wherein the first mesh node is a mesh node outside a key update blacklist that fails to send a first notification in a key refresh procedure.

10. A device comprising at least one processor and a memory, wherein the memory stores computer-executable instructions, and wherein the at least one processor executes the computer-executable instructions to cause the device to perform at least the following operation:
determining a first mesh node from at least two mesh nodes in a Bluetooth mesh network comprising the at least two mesh nodes,
wherein the device is a mesh node in the Bluetooth mesh network,
wherein the device configures a network key of the Bluetooth mesh network,
wherein a first network key locally maintained by the first mesh node is inconsistent with a second network key of the Bluetooth mesh network, and
wherein determining the first mesh node includes either
receiving a second message used to request to synchronize the network key and determining a mesh node indicated by a requester identifier carried in the second message as the first mesh node based on the mesh node indicated by the requester identifier not being a deleted node, or
determining each long power supply node in an update failure list as the first mesh node, wherein the update failure list is records all mesh nodes that fail to update a key and are not deleted nodes in the Bluetooth mesh network, and the long power supply node is a mesh node other than a low power node in the Bluetooth mesh network;
encrypting the second network key by using a device key of the first mesh node to obtain a first ciphertext; and
sending a first message so that the first mesh node obtains the second network key, wherein the first message carries the first ciphertext.

11. The device according to claim 10, wherein the device is a mesh node that functions as a gateway node.

12. The device according to claim 10, wherein the device is a mesh node that functions as a long power supply node.

13. The device according to claim 10, wherein the first message is a broadcast frame that carries an identifier of the first mesh node.

14. The device according to claim 10, wherein the first mesh node is a mesh node outside a key update blacklist that fails to send a first notification in a key refresh procedure.

* * * * *